(12) United States Patent
Oh et al.

(10) Patent No.: US 9,746,725 B2
(45) Date of Patent: Aug. 29, 2017

(54) LIQUID CRYSTAL DISPLAY AND MANUFACTURING METHOD THEREOF

(71) Applicant: Samsung Display Co., Ltd., Yongin (KR)

(72) Inventors: Hwa Yeul Oh, Seoul (KR); Sung Man Kim, Seoul (KR); Young Je Cho, Asan-si (KR); Min-Chul Song, Cheonan-si (KR); Eu Gene Lee, Asan-si (KR); Soo Jung Chae, Cheonan-si (KR); Hyun Ki Hwang, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 371 days.

(21) Appl. No.: 14/177,821

(22) Filed: Feb. 11, 2014

(65) Prior Publication Data

US 2014/0232963 A1    Aug. 21, 2014

(30) Foreign Application Priority Data

Feb. 15, 2013 (KR) .................. 10-2013-0016584

(51) Int. Cl.
G02F 1/1343    (2006.01)

(52) U.S. Cl.
CPC .............. *G02F 1/134363* (2013.01); *G02F 2001/134372* (2013.01)

(58) Field of Classification Search
CPC ......... G02F 1/134336; G02F 1/134363; G02F 2001/134372

USPC ......................................................... 349/141
See application file for complete search history.

(56) References Cited

U.S. PATENT DOCUMENTS

| | | | | |
|---|---|---|---|---|
| 6,507,383 | B1 * | 1/2003 | Abe .................. | G02F 1/134363 349/138 |
| 7,528,917 | B2 * | 5/2009 | Kim .................. | G02F 1/136209 349/106 |
| 7,777,852 | B2 | 8/2010 | Kawasaki et al. | |
| 7,782,435 | B2 | 8/2010 | Lim | |

(Continued)

FOREIGN PATENT DOCUMENTS

JP    2012-088744    5/2012
KR  10-2011-0066737    6/2011

(Continued)

*Primary Examiner* — Charles Chang
(74) *Attorney, Agent, or Firm* — H.C. Park & Associates, PLC

(57) ABSTRACT

A liquid crystal display, includes: a substrate; a gate line including a gate pad and a data line including a data pad, the gate and data lines being disposed on the substrate; a thin film transistor connected to the gate line and the data line; an organic layer disposed on the thin film transistor; a pixel electrode disposed on the organic layer; a first contact assistant disposed on the gate pad; a second contact assistant disposed on the data pad; a first insulating layer disposed on the pixel electrode; and a common electrode disposed on the first insulating layer, the common electrode overlapping with the pixel electrode. The common electrode includes first cutouts, the first insulating layer includes second cutouts, the plane shapes of the first and second cutouts are substantially the same, and the pixel electrode includes a polycrystalline transparent conductive material.

6 Claims, 41 Drawing Sheets

(56) References Cited

U.S. PATENT DOCUMENTS

2002/0149729 A1* 10/2002 Nishimura ........ G02F 1/134363
          349/141
2009/0073364 A1   3/2009 Matsuno
2012/0092606 A1   4/2012 Tai et al.
2012/0107982 A1   5/2012 Song et al.

FOREIGN PATENT DOCUMENTS

| KR | 10-2011-0113398 | 10/2011 |
| KR | 10-2012-0003771 | 1/2012 |
| KR | 10-2012-0075124 | 7/2012 |
| KR | 10-2012-0113430 | 10/2012 |

* cited by examiner

LIQUID CRYSTAL DISPLAY AND MANUFACTURING METHOD THEREOF

CROSS-REFERENCE TO RELATED APPLICATION

This application claims priority from and the benefit of Korean Patent Application No. 10-2013-0016584, filed on Feb. 15, 2013, which is incorporated by reference for all purposes as if set forth herein.

BACKGROUND

Field

Exemplary embodiments relate to display technology, and more particularly to, a liquid crystal display and a manufacturing method thereof.

Discussion

Conventional liquid crystal displays typically display images by applying voltages to field-generating electrodes that generate an electric field in a liquid crystal (LC) layer that orients LC molecules disposed therein that, in turn, adjusts polarization of incident light.

Typically, liquid crystal displays are light weight, thin, and relatively easy to manufacture; however, lateral visibility of such displays may be lower than frontal visibility. This may be addressed through various liquid crystal arrangements and driving methods. Another technique to realize a wide viewing angle involves forming a pixel electrode and a common electrode on a same substrate. In this manner, a liquid crystal display of such a configuration may include at least one of the pixel electrode and the common electrode including a plurality of cutouts and a plurality of branch electrodes defined by the plurality of cutouts. Accordingly, when forming the aforementioned field generating electrodes on the same display substrate, a number of photomasks (or reticles) are typically utilized. This increases manufacturing time, cost, and complexity.

Therefore, there is a need for an approach that provides more efficient, cost effective techniques to form a plurality of field generating electrodes on a display substrate.

The above information disclosed in this Background section is only for enhancement of understanding of the background of the invention, and, therefore, it may contain information that does not form the prior art that is already known in this country to a person of ordinary skill in the art.

SUMMARY

Exemplary embodiments provide a manufacturing method to more efficiently and cost-effectively form two field generating electrodes on the same display substrate, as well as a liquid crystal display fabricated therefrom.

Additional aspects will be set forth in the detailed description which follows and, in part, will be apparent from the disclosure, or may be learned by practice of the invention.

According to exemplary embodiments, a liquid crystal display, includes: a substrate; a gate line including a gate pad, the gate line being disposed on the substrate; a data line including a data pad, the data line being disposed on the substrate; a thin film transistor connected to the gate line and the data line; an organic layer disposed on the thin film transistor; a pixel electrode disposed on the organic layer; a first contact assistant disposed on the gate pad, a second contact assistant disposed on the data pad; a first insulating layer disposed on the pixel electrode; and a common electrode disposed on the first insulating layer, the common electrode overlapping with the pixel electrode. The common electrode includes first cutouts, the first insulating layer includes second cutouts, the plane shape of the first cutouts and the second cutouts are substantially the same, and the pixel electrode includes a polycrystalline transparent conductive material.

According to exemplary embodiments, a liquid crystal display, includes: a substrate; a gate line including a gate pad, the gate line being disposed on the substrate; a data line including a data pad, the data line being disposed on the substrate; a thin film transistor connected to the gate line and the data line; an organic layer disposed on the thin film transistor; a pixel electrode disposed on the organic layer; a first contact assistant disposed on the gate pad; a second contact assistant disposed on the data pad; a first insulating layer disposed on the pixel electrode; and a common electrode disposed on the first insulating layer, the common electrode overlapping with the pixel electrode. The common electrode includes first cutouts. The edge of the first insulating layer is protruded from the edge of the common electrode.

According to exemplary embodiments, a method of manufacturing a liquid crystal display, includes: forming a gate line including a gate pad and a data line including a data pad on a substrate; forming an organic layer on the gate line and the data line; forming a pixel electrode on the organic layer, a first contact assistant on the gate pad, and a second contact assistant on the data pad; annealing the pixel electrode, the first contact assistant, and the second contact assistant to form a polycrystalline material; depositing a first layer including an insulating material on the pixel electrode, the first contact assistant, and the second contact assistant; depositing a second layer including a transparent conductive material on the first layer; forming a first photosensitive film pattern including different thicknesses in different regions thereof; etching the second layer and the first layer using the first photosensitive film pattern as an etching mask to expose at least a portion of the first contact assistant and the second contact assistant; partially removing the first photosensitive film pattern to form a second photosensitive film pattern; and etching the second layer and the first layer using the second photosensitive film pattern as an etching mask to form a common electrode including first cutouts and a first insulating layer including second cutouts.

According to exemplary embodiments, a method of manufacturing a liquid crystal display, includes: forming a gate line including a gate pad and a data line including a data pad on a substrate; forming an organic layer on the gate line and the data line; forming a pixel electrode on the organic layer, a first contact assistant on the gate pad, and a second contact assistant on the data pad; depositing a first layer including an insulating material on the pixel electrode, the first contact assistant, and the second contact assistant; depositing a second layer including a transparent conductive material on the first layer; forming a first photosensitive film pattern on the second layer; etching the second layer using the first photosensitive film pattern as an etching mask to form a common electrode including first cutouts; reflowing the first photosensitive film pattern to form a second photosensitive film pattern covering the first cutouts and an outer edge of the common electrode; and etching the first layer using the second photosensitive film pattern as an etching mask to: form a first insulating layer protruded from the edge of the common electrode, and expose at least a portion of the first contact assistant and the second contact assistant.

According to exemplary embodiments, a liquid crystal display including two field generating electrodes formed on the same display substrate may be more efficiently and cost-effectively manufactured.

The foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
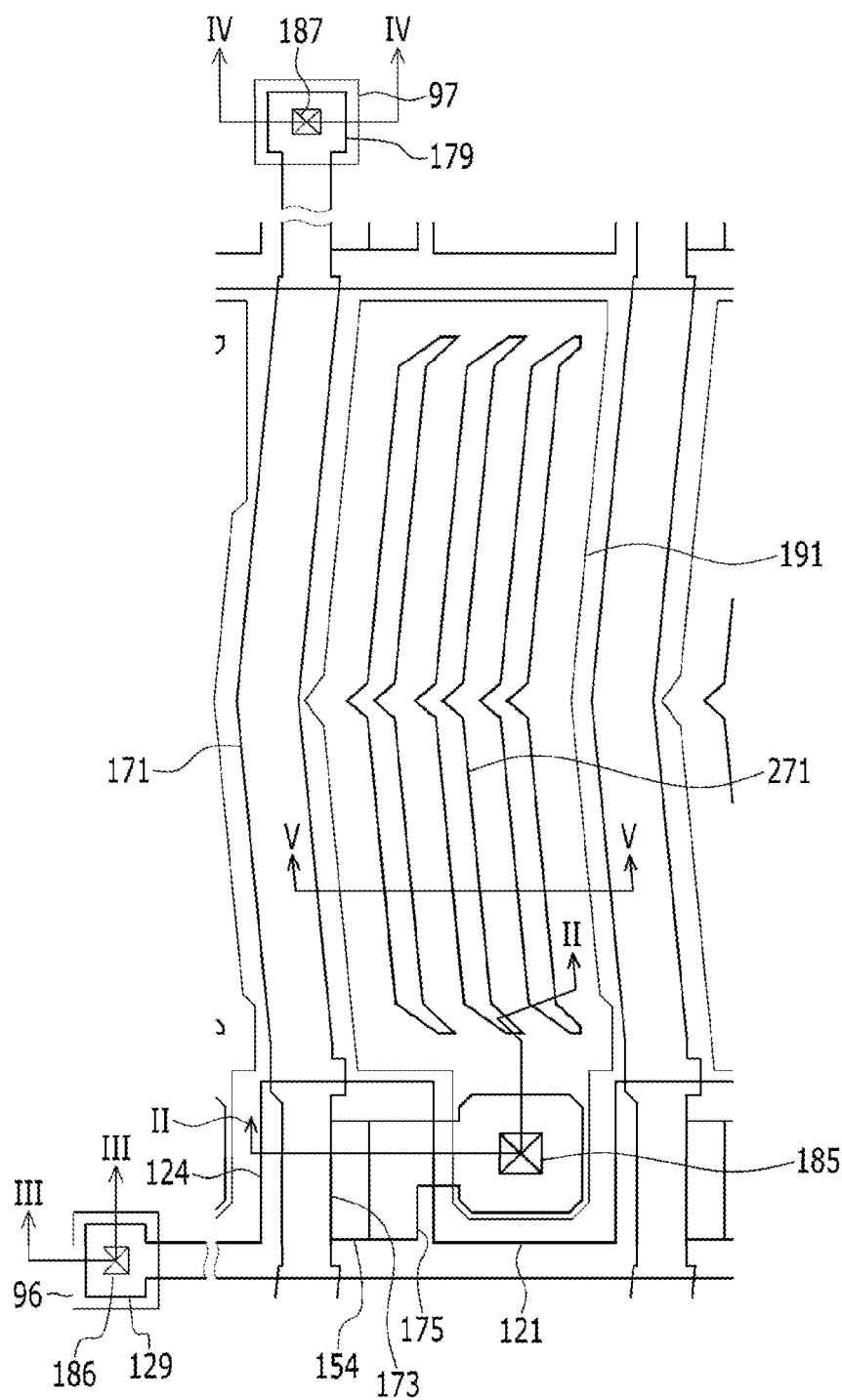
FIG. 1 is a layout view of a liquid crystal display, according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers and/or sections, these elements, components, regions, layers and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath," "below," "lower," "above," "upper," and/or the like, may be used herein for descriptive purposes, and thereby, to describe one element or feature's relationship to another element(s) or feature(s) as illustrated in the drawings. Spatially relative terms are intended to encompass different orientations of an apparatus in use or operation in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and as such, the spatially relative descriptors used herein interpreted accordingly.

The terminology used herein is for the purpose of describing particular embodiments and is not intended to be limiting. As used herein, the singular forms "a," "an," and "the" are intended to include the plural forms as well, unless the context clearly indicates otherwise. Moreover, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
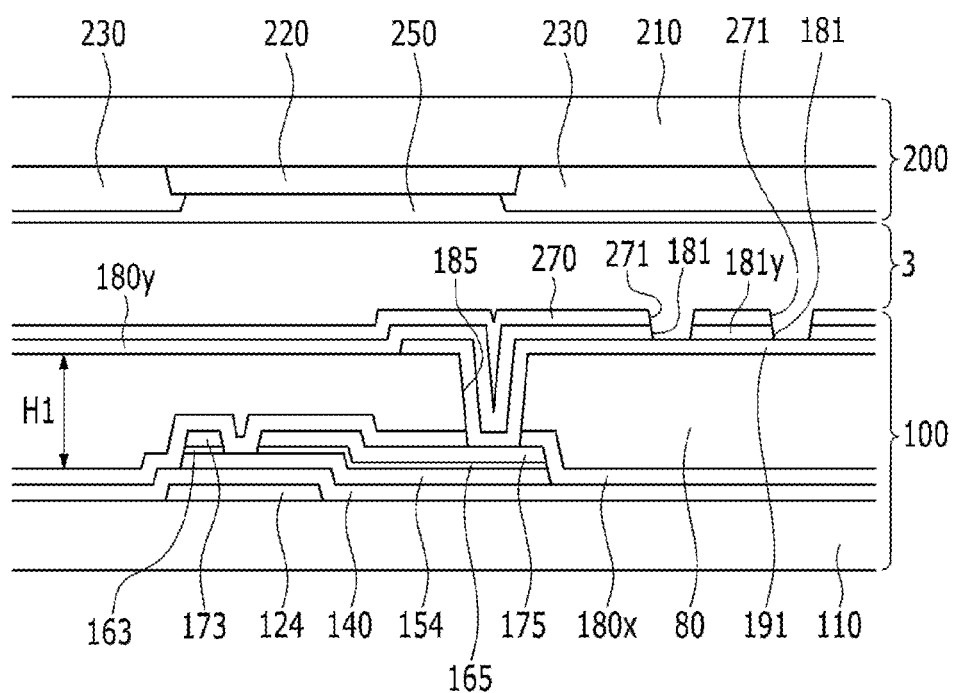
FIG. 2 is a cross-sectional view of the liquid crystal display of FIG. 1 taken along sectional line II-II, according to exemplary embodiments.
Figure 3:
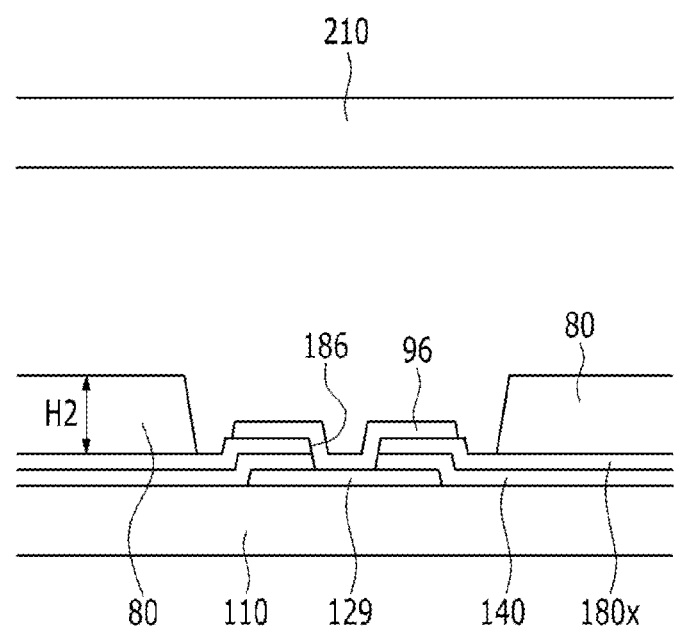
FIG. 3 is a cross-sectional view of the liquid crystal display of FIG. 1 taken along sectional line III-III, according to exemplary embodiments.
Figure 4:
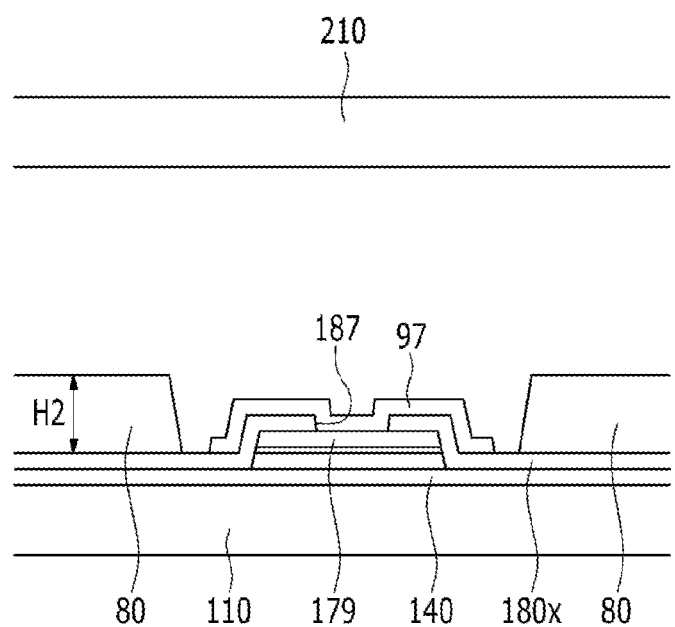
FIG. 4 is a cross-sectional view of the liquid crystal display of FIG. 1 taken along sectional line IV-IV, according to exemplary embodiments.

FIG. 1 is a layout view of a liquid crystal display, according to exemplary embodiments. FIG. 2 is a cross-sectional view of the liquid crystal display of FIG. 1 taken along sectional line II-II. FIG. 3 is a cross-sectional view of the liquid crystal display of FIG. 1 taken along sectional line III-III. FIG. 4 is a cross-sectional view of the liquid crystal display of FIG. 1 taken along sectional line IV-IV.

Referring to FIGS. 1-4, a liquid crystal display, according to exemplary embodiments, includes a lower panel 100, an upper panel 200 facing the lower panel 100, and a liquid crystal layer 3 disposed therebetween.

The lower panel 100 will now be described in more detail.

Lower panel 100 includes a gate conductor including a plurality of gate lines 121 formed on a first insulating substrate 110. The first insulating substrate 110 may be formed of (or otherwise include) transparent glass, plastics, and the like.

Each gate line 121 includes a plurality of gate electrodes 124, and a gate pad 129 including a wide area to connect with another layer or an external driving circuit. The gate lines 121 may be made of any suitable material, such as, for example, an aluminum-based metal (e.g., aluminum (Al) or an Al alloy), a silver-based metal, (e.g., silver (Ag) or a Ag alloy), a copper-based metal (e.g., copper (Cu) or a Cu alloy), a molybdenum-based metal (e.g., molybdenum (Mo) or a Mo alloy), a chromium-based metal (e.g., chromium (Cr) or a Cr alloy), a tantalum-based metal (e.g., tantalum (Ta) or a Ta alloy), a titanium-based metal (e.g., titanium (Ti) or a Ti alloy), and/or the like. However, the gate lines 121 may be multilayered structures including at least two conductive layers of different physical properties.

A gate insulating layer 140 formed of any suitable material, such as, for instance, silicon nitride (SiNx), silicon oxide (SiOx), and the like, may be formed on the gate conductors 121, 124, and 129. However, the gate insulating layer 140 may be a multilayered structure including at least two insulating layers of different physical properties.

A plurality of semiconductors 154 made of (or otherwise including) amorphous silicon, polysilicon, and the like, is formed on the gate insulating layer 140. It is contemplated, however, that the semiconductors 154 may be oxide-based semiconductors.

Ohmic contacts 163 and 165 may be formed on the semiconductors 154. The ohmic contacts 163 and 165 may made of any suitable material, such as, for instance, n+ hydrogenated amorphous silicon, in which an n-type impurity, such as, for example, phosphorus is doped at a high concentration. As another example, the ohmic contacts 163 and 165 may be formed of silicide. In exemplary embodiments, the ohmic contacts 163 and 165 may form a pair of ohmic contacts, which are disposed on each semiconductor 154. In the manner, when the semiconductors 154 are oxide semiconductors, the ohmic contacts 163 and 165 may be omitted.

A data conductor including a plurality of data lines 171 including a plurality of source electrodes 173 and a plurality of drain electrodes 175 may be formed on the ohmic contacts 163 and 165, and, thereby, disposed on the gate insulating layer 140. Each data line 171 may include a data pad 179 including a wide area to connect to another layer or an external driving circuit. Each data line 171 transports a data signal and extends in substantially a first (e.g., vertical or column) direction. In this manner, the data lines 171 cross the gate lines 121, which extend in substantially a second (e.g., horizontal or row) direction. It is contemplated; however, that the directions of extension of the gate and data lines 121 and 171 may be swapped, such that the gate lines 121 extend substantially in the second direction and the data lines extend in substantially the first direction. Any other suitable configuration may be utilized.

According to exemplary embodiments, the data lines 171 may include first and second bent portions respectively bent in the second direction. This bent shape may facilitate increased transmittance of the liquid crystal display and may repetitively occur in association with each pixel of the liquid crystal display. In this manner, the first and second bent portions may meet each other in a middle region of each corresponding pixel to form a sideways V shape. In this manner, the second bent portion may be bent to form a determined angle with the first bent portion. While not illustrated, the data lines 171 may include a third bent portion bent to form a determined angle with the first and second bent portions. In this manner, the third bent portion may form a sideways V shape that is protruded from the sideways V shape of the first and second bent portions, such as illustrated in association with cutouts 271 of common electrode 270.

The first and second bent portions of the data line 171 may be respectively bent at about ±7° from an imaginary vertical reference line perpendicular to the second direction. The third bent portion, which may be disposed in the middle region of a pixel, may include corresponding portions that are further bent at about ±7° to about ±15° with respect to the first and second bent portions.

In exemplary embodiments, the source electrodes 173 are portions of the data lines 171, and may be disposed on the same layer as the data lines 171. The drain electrodes 175 extend substantially parallel to the source electrodes 173. Accordingly, the drain electrodes 175 are parallel to a portion of the data lines 171.

According to exemplary embodiments, a gate electrode 124, a source electrode 173, and a drain electrode 175 form a switching element, e.g., a thin film transistor (TFT), in conjunction with a semiconductor 154. A channel of the TFT may be formed in or disposed on the semiconductor 154 between the source electrode 173 and the drain electrode 175.

The liquid crystal display, according to exemplary embodiments, may include the source electrodes 173 disposed on the same layer as the data lines 171. To this end, the drain electrodes 175, which may extend parallel to a portion of the data line 171, may increase a width of the TFT. In this manner, however, the area of the data conductor may not be increased, which may increase an opening (or aperture) ratio of the liquid crystal display. It is also contemplated that the source electrodes 173 and the drain electrodes 175 may be differently shaped.

In exemplary embodiments, the data lines 171 and the drain electrodes 175 may be made of any suitable material, e.g., refractory metal, such as, for instance, Mo, Cr, Ta, Ti, etc., or an alloy thereof. The data lines 171 and/or the drain electrodes 175 may be multilayered structures including, for example, a refractory metal layer (not shown) and a low resistance conductive layer (not shown) formed on one another. For instance, the multilayered structure may include a double layer structure including, for example, a Cr or Mo (or an alloy thereof) first (or lower) layer and an Al (or an alloy thereof) second (or upper) layer, a triple layer structure including, for instance, a Mo (or an alloy thereof) lower layer, an Al (or an alloy thereof) middle layer, and a Mo (or an alloy thereof) upper layer. It is contemplated, however, that the data lines 171 and the drain electrodes 175 may be made of any suitable conductive material and/or any suitable number of layers.

A first passivation layer 180x is disposed on the data conductors 171, 173, 175, and 179, the gate insulating layer 140, and exposed portions of the semiconductors 154. The first passivation layer 180x may include an organic insulating material, an inorganic insulating material, and/or the like.

An organic layer 80 is disposed on the first passivation layer 180x. The organic layer 80 may be thicker than the first passivation layer 180x and may have a flat surface, such as a flat upper surface.

A first thickness H1 of a portion of the organic layer 80 disposed in a display area where a plurality of pixels are disposed to display an image may be larger than a second thickness H2 of a portion of the organic layer 80 disposed in a peripheral area where the gate pad 129 or the data pad 179 are disposed. It is contemplated that the organic layer 80 may be omitted.

According to exemplary embodiments, the organic layer 80, the first passivation layer 180x, and the gate insulating layer 140 include a first contact hole 186 exposing the gate pad 129. The organic layer 80 and the first passivation layer 180x also include a second contact hole 187 exposing the data pad 179, as well as a third contact hole 185 exposing the drain electrode 175.

A plurality of pixel electrodes 191 may be formed on the organic layer 80. The pixel electrodes 191 include a curved edge that is substantially parallel to the first bent portion and the second bent portion of the data line 171.

A first contact assistant 96 covering the gate pad 129 exposed through the first contact hole 186 may be formed on the first passivation layer 180x, and a second contact assistant 97 covering the data pad 179 exposed through the second contact hole 187 may be formed on the first passivation layer 180x. The first contact assistant 96 and the second contact assistant 97 are connected to the gate pad 129 and the data pad 179 through the first and second contact holes 186 and 187, respectively. The first and second contact assistants 96 and 97 may enhance adhesion of external devices (not shown) with the gate pad 129 and data pad 179. The first and second contact assistants 96 and 97 may also serve to protect the gate pad 129 and the data pad 179.

In exemplary embodiments, the pixel electrodes 191, the first contact assistant 96, and the second contact assistant 97 may be formed of any suitable transparent conductive material, such as, for instance, polycrystalline aluminum zinc oxide (AZO), gallium zinc oxide (GZO), indium tin oxide (ITO), indium zinc oxide (IZO), etc. It is also contemplated that one or more conductive polymers (ICP) may be utilized, such as, for example, polyaniline, poly(3,4-ethylenedioxythiophene) poly(styrenesulfonate) (PEDOT:PSS), etc.

Each pixel electrode 191 is physically and electrically connected to the drain electrode 175 through the third contact hole 185 formed in the organic layer 80 and the first passivation layer 180x. As such, each pixel electrode 191 is configured to receive a voltage (e.g., data voltage) from the drain electrode 175.

A second passivation layer 180y may be formed on the pixel electrodes 191. A common electrode 270 may be formed on the second passivation layer 180y. The common electrode 270 may be made of any suitable transparent conductive material, such as, for example, AZO, GZO, ITO, IZO, etc. It is also contemplated that one or more conductive polymers (ICP) may be utilized, such as, for example, polyaniline, poly(3,4-ethylenedioxythiophene) poly(styrenesulfonate) (PEDOT:PSS), etc.

In exemplary embodiments, the second passivation layer 180y and the common electrode 270 disposed on the second passivation layer 180y may exhibit substantially the same plane shape. The second passivation layer 180y and the common electrode 270 may be disposed in the display area including a plurality of pixels, but may not be disposed in the peripheral area where the gate pads 129 and the data pads 179 are formed.

The common electrode 270 may include a plurality of first cutouts 271, and the second passivation layer 180y has a plurality of second cutouts 181. The first cutouts 271 of the common electrode 270 and the second cutouts 181 of the passivation layer 180y may form substantially the same plane shape.

Although not shown, an alignment layer may be coated on the common electrode 270 and the pixel electrodes 191 exposed by the second cutouts 181 of the second passivation layer 180y and the first cutouts 271 of the common electrode 270. The alignment layer may be a horizontal alignment layer that is rubbed in a determined direction. It is also contemplated, however, that the alignment layer may additionally (or alternatively) include an optical reaction material that is optically aligned to prealign liquid crystal molecules of the liquid crystal layer 3.

The upper display panel 200 will now be described in more detail.

A light blocking member 220 may be formed on a second insulating substrate 210 made of (or otherwise include) any suitable material, e.g., transparent glass, plastic, etc. The light blocking member 220 may also be referred to as a black matrix. In this manner, the light blocking member 220 is configured to prevent light leakage.

A plurality of color filters 230 may be formed on the second substrate 210. The color filters 230 may overlap with at least a portion of the light blocking member 220.

An overcoat 250 may be formed on the color filters 230 and the light blocking member 220. The overcoat 250 may be made of (or otherwise include) any suitable material, such as, for instance, an (organic) insulator. As such, the overcoat 250 may prevent exposure of the color filters 230 to contaminants, as well as provide a flat surface. It is also contemplated that the overcoat 250 may be omitted. Further, an alignment layer (not shown) may be disposed on the overcoat 250 and may be similar to the alignment layer (not illustrated) that may be disposed on the common electrode 270 and the pixel electrodes 191 exposed by the second cutouts 181 of the second passivation layer 180y and the first cutouts 271 of the common electrode 270.

According to exemplary embodiments, the liquid crystal layer 3 includes a nematic liquid crystal material having positive dielectric anisotropy. Liquid crystal (LC) molecules of the liquid crystal layer 3 may be arranged so that a long axis direction thereof is parallel to the upper and lower panels 100 and 200.

During operation, the pixel electrodes 191 receive data voltages from the drains electrodes 175, and the common electrode 270 receives a common voltage having a determined magnitude from a common voltage application portion (described in more detail in association with FIG. 6), which may be disposed outside of the display region, e.g., in the peripheral area. In this manner, the liquid crystal molecules of the liquid crystal layer 3 disposed on the two field generating electrodes 191 and 270 may be rotated in a direction parallel to a direction of an imposed electric field when the electric field is generated in association with the pixel electrode 191 and the common electrode 270. As previously described, based on the rotational direction of the liquid crystal molecules, the polarization of incident light passing through the liquid crystal layer 3 may be changed to facilitate the display of images.

According to exemplary embodiments, the second passivation layer 180y disposed on the pixel electrodes 191 and the common electrode 270 disposed on the second passivation layer 180y include substantially the same plane shape. This may result from the common electrode 270 including the first cutouts 271, the second passivation layer 180y including the second cutouts 181, and the first cutouts 271 and the second cutouts 181 including substantially the same plane shape. As such, the second passivation layer 180y and the common electrode 270 may be formed together using one photomask (or reticle), which may reduce manufacturing costs, time, and complexity.

As seen in FIGS. 1-4, the organic layer 80 may be disposed on the first passivation layer 180x of the lower panel 100, and the upper panel 200 may include the color filter 230 and the light blocking member 220. It is contemplated, however, that the color filters 230 may be disposed on the lower panel 100 instead of (or in place of) the organic layer 80, and, as such, the upper panel 200 may not include the color filters 230. In this manner, the light blocking member 220 may also be disposed on the lower panel 100 rather than the upper panel 200. Such a configuration is described in more detail in association with FIGS. 5A-5C.

Figure 5A:
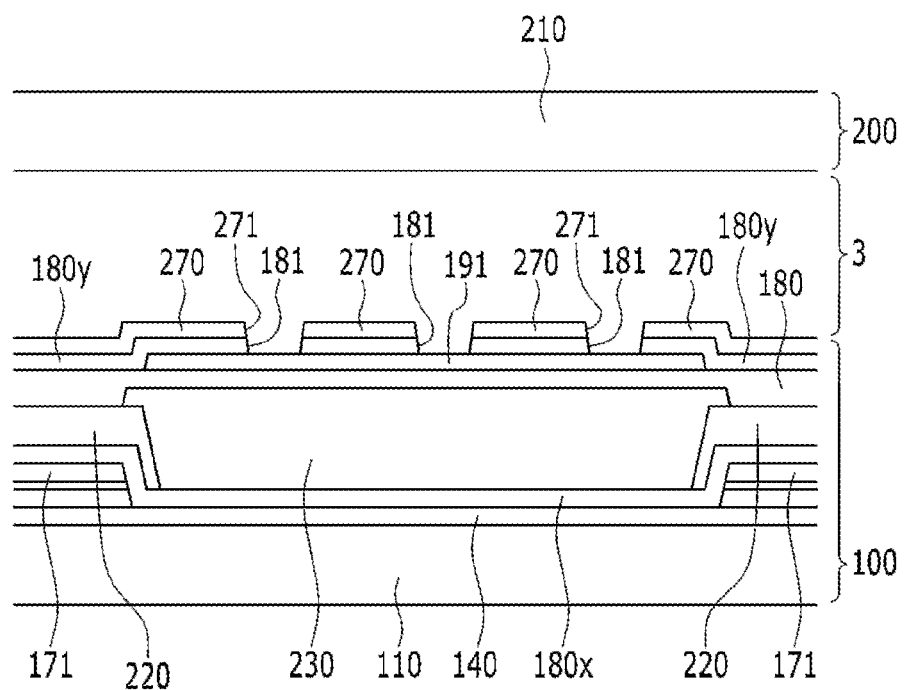
FIGS. 5A-5C are respective cross-sectional views of a modified version of the liquid crystal display of FIG. 1 taken along a similar sectional line as sectional line V-V, according to exemplary embodiments.
Figure 5B:
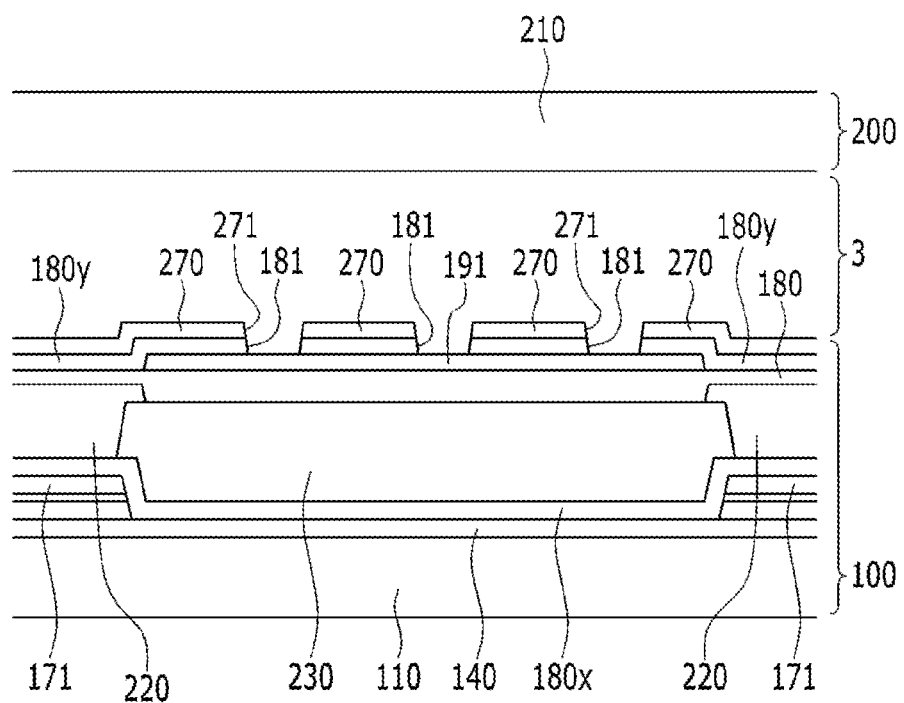
Figure 5C:
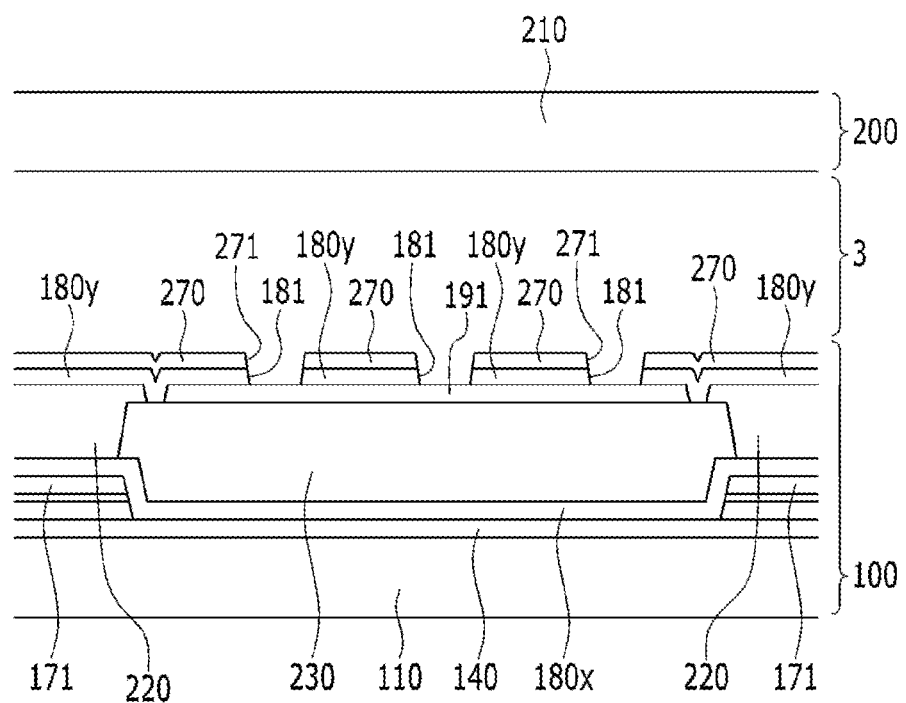

FIG. 5A-FIG. 5C are respective cross-sectional views of a modified version of the liquid crystal display of FIG. 1 taken along sectional line V-V, according to exemplary embodiments. It is noted that the liquid crystal displays of FIGS. 5A-5C are substantially similar to the liquid crystal display of FIGS. 1-4, and, as such, differences between these liquid crystal displays are described below. In other words, to avoid obscuring exemplary embodiments described herein, duplicative descriptions of similarly configured features are omitted.

Referring to FIG. 5A, the light blocking member 220 is disposed on the first passivation layer 180x of the lower panel 100. The light blocking member 220 is disposed in a region corresponding to the gate lines 121 and the data lines 171. The color filters 230 are disposed on the first passivation layer 180x and at least a portion of the light blocking member 220. A capping layer 180 is disposed on the light blocking member 220 and the color filters 230. The capping layer 180 prevents a pigment of the light blocking member 220 and the color filters 230 from flowing into (or otherwise contaminating) the liquid crystal layer 3.

The pixel electrodes 191 are disposed on the capping layer 180. The second passivation layer 180y and the common electrode 270 are disposed on the pixel electrodes 191. The common electrode 270 and the second passivation layer 180y respectively include the first cutouts 271 and the second cutouts 181 that may include substantially the same plane shape.

Accordingly, the light blocking member 220 and the color filters 230 are not disposed on the upper panel 200.

Referring to FIG. 5B, the color filters 230 are disposed on the first passivation layer 180x of the lower panel 100. The color filters 230 are disposed in a region corresponding to a display area of each of the pixel electrodes 191. The light blocking member 220 is disposed on the first passivation layer 180x and at least a portion of the color filter 230. The light blocking member 220 is disposed in a region corresponding to a non-display area associated with the gate lines 121 and the data lines 171. The capping layer 180 is disposed on the light blocking member 220 and the color filters 230. As previously noted, the capping layer 180 prevents a pigment of the light blocking member 220 and the color filters 230 from flowing into (or otherwise contaminating) the liquid crystal layer 3.

The pixel electrodes 191 are disposed on the capping layer 180. The second passivation layer 180y and the common electrode 270 are disposed on the pixel electrode 191. The common electrode 270 and the second passivation layer 180y respectively include the first cutouts 271 and the second cutouts 181 that may include substantially the same plane shape.

Accordingly, the light blocking member 220 and the color filters 230 are not disposed on the upper panel 200.

Referring to FIG. 5C, the liquid crystal display is substantially similar to the liquid crystal display of FIG. 5A, but the liquid crystal display of FIG. 5C does not include the capping layer 180. As such, the light blocking member 220 is disposed on the first passivation layer 180x of the lower panel 100. The light blocking member 220 is disposed in a region corresponding to a non-display area associated with the gate lines 121 and the data lines 171. The light blocking member 220 is disposed on the first passivation layer 180x and at least a portion of color filters 230. While not illustrated, the color filters 230 may be disposed on the first passivation layer 180x and at least a portion of the light blocking member 220.

The pixel electrodes 191 are disposed on the color filter 230. The second passivation layer 180y and the common electrode 270 are disposed on the pixel electrode 191. The common electrode 270 and the second passivation layer 180y respectively include the first cutouts 271 and the second cutouts 181 that include substantially the same plane shape.

Accordingly, the light blocking member 220 and the color filters 230 are not disposed on the upper panel 200.

Figure 6:
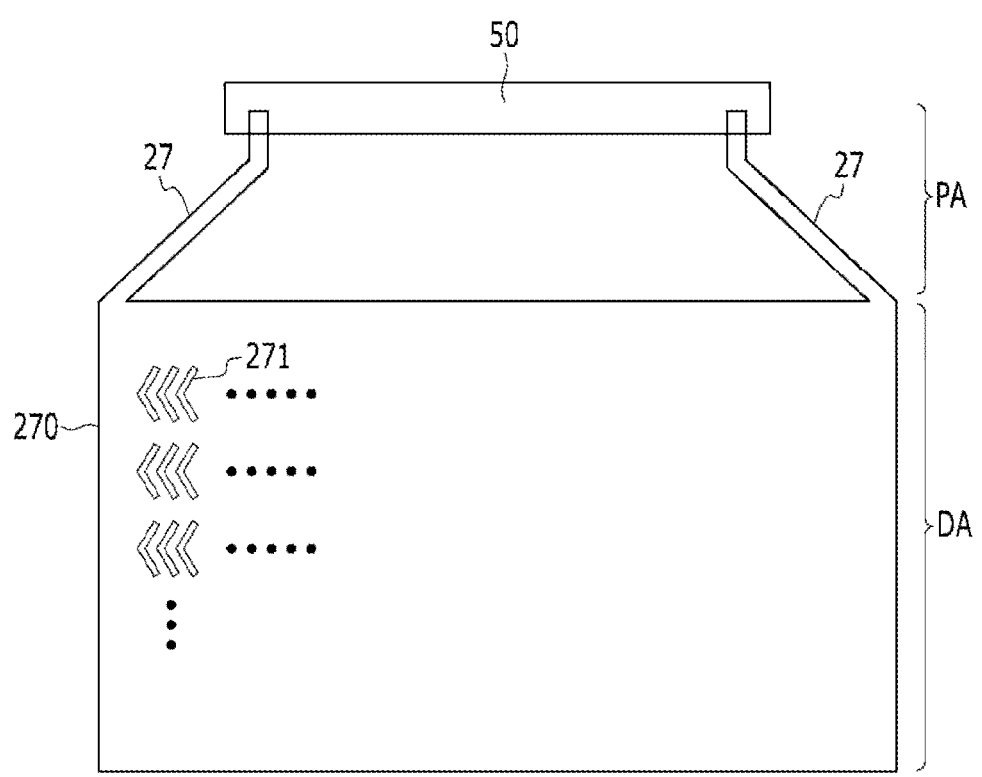
FIG. 6 is a layout view of a portion of a liquid crystal display, according to exemplary embodiments.

An exemplary plane shape of the common electrode 270 will now be described in more detail with reference to FIG. 6. FIG. 6 is a layout view of a portion of a liquid crystal display, according to exemplary embodiments.

Referring to FIG. 6, the liquid crystal display includes a display area DA including a plurality of pixels and a peripheral area PA near the display area DA.

The common electrode 270 including the plurality of first cutouts 271 disposed in association with each pixel area is disposed in the display area DA. The first cutouts 271, which are disposed in association with each pixel area, are also spatially formed in correspondence with each pixel electrode 191 disposed in each respective pixel area.

A common voltage application unit 50 applying the common voltage to the common electrode 270 is disposed in the peripheral area PA. A connection 27 is disposed between the common voltage application unit 50 and the common electrode 270. The common electrode 270 and the connection 27 may be simultaneously formed in the same layer. As shown, the common electrode 270 may include substantially the same plane shape as the underlying second passivation layer 180y.

An exemplary manufacturing method to fabricate an exemplary liquid crystal display will now be described in more detail with reference to FIGS. 7-28, as well as in conjunction with FIGS. 1-4.

Figure 7:
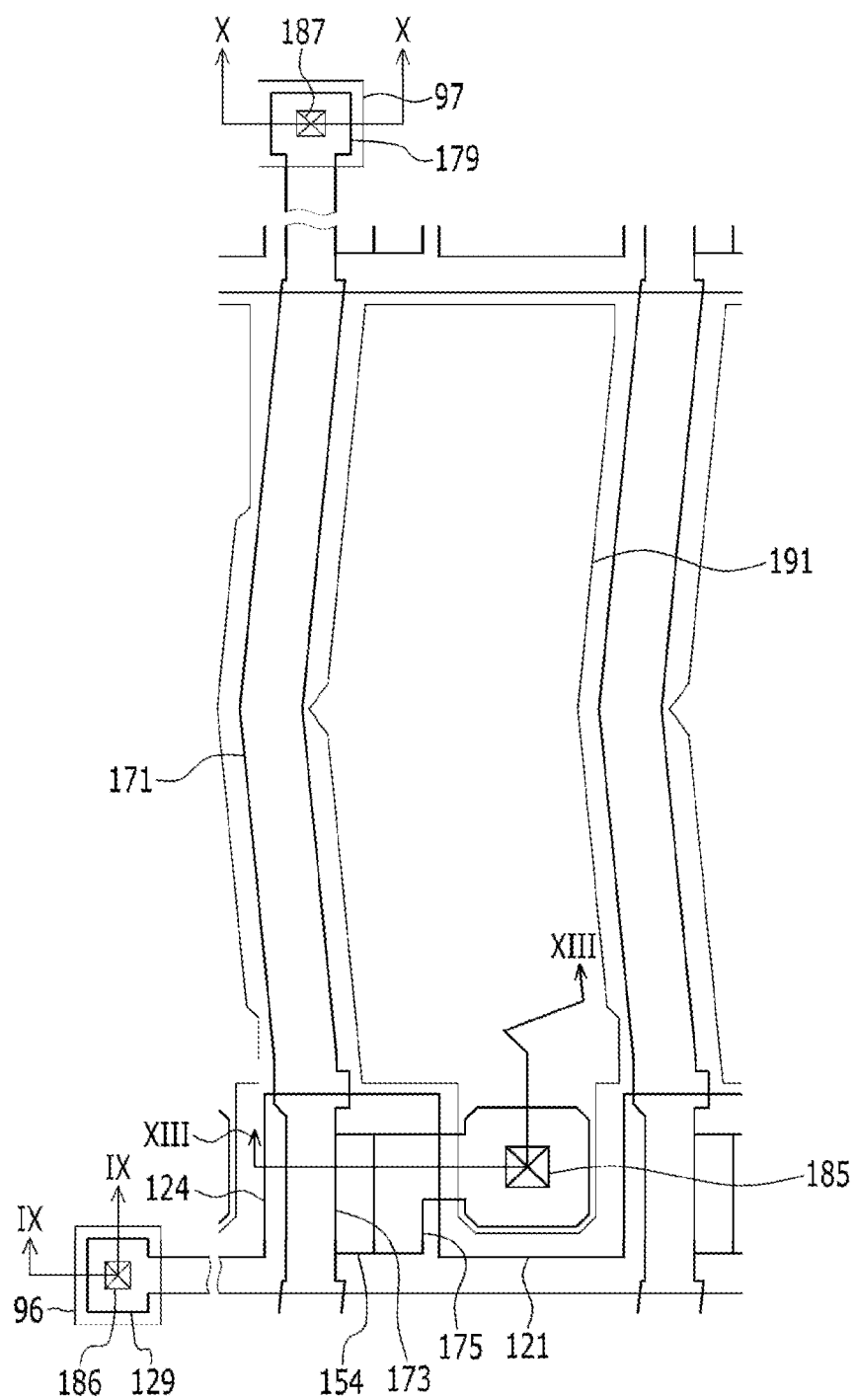
FIG. 7 is a layout view of a partially formed liquid crystal display, according to exemplary embodiments.
Figure 8:
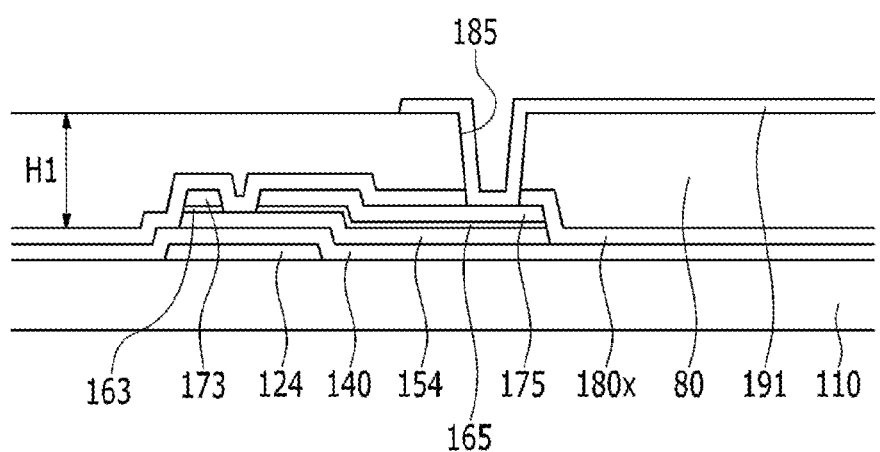
FIG. 8 is a cross-sectional view of the partially formed liquid crystal display of FIG. 7 taken along sectional line VIII-VIII, according to exemplary embodiments.
Figure 9:
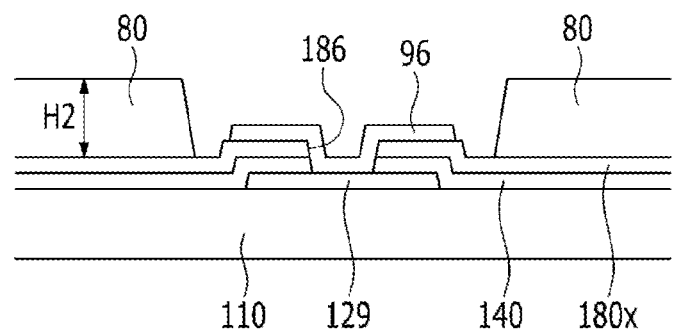
FIG. 9 is a cross-sectional view of the partially formed liquid crystal display of FIG. 7 taken along sectional line IX-IX, according to exemplary embodiments.
Figure 10:
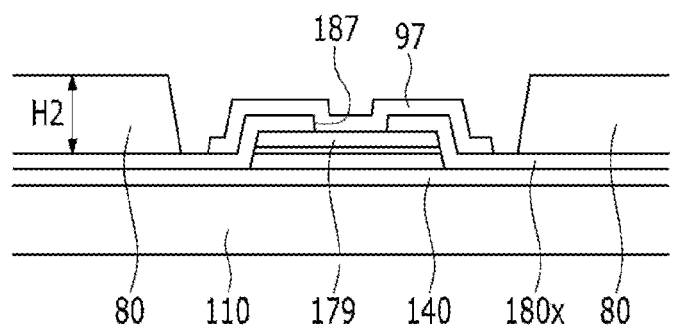
FIG. 10 is a cross-sectional view of the partially formed liquid crystal display of FIG. 7 taken along sectional line X-X, according to exemplary embodiments.

FIG. 7 is a layout view of a partially formed liquid crystal display, according to exemplary embodiments. FIG. 8 is a cross-sectional view of the partially formed liquid crystal display of FIG. 7 taken along sectional line VIII-VIII. FIG. 9 is a cross-sectional view of the partially formed liquid crystal display of FIG. 7 taken along sectional line IX-IX. FIG. 10 is a cross-sectional view of the partially formed liquid crystal display of FIG. 7 taken along sectional line X-X. FIGS. 11, 14, 17, 20, 23, and 26 are respective cross-sectional views of the liquid crystal display of FIG. 1 taken along sectional line II-II at various manufacturing stages, according to exemplary embodiments. FIGS. 12, 15, 18, 21, 24, and 27 are respective cross-sectional views of the liquid crystal display of FIG. 1 taken along sectional line III-III at various manufacturing stages, according to exemplary embodiments. FIGS. 13, 16, 19, 22, 25, and 28 are respective cross-sectional views of the liquid crystal display of FIG. 1 taken along sectional line IV-IV at various manufacturing stages, according to exemplary embodiments.

As shown in FIGS. 7-10, a plurality of gate lines 121 including a plurality of gate electrodes 124 and a plurality of gate pads 129 are formed on the first insulation substrate 110. A gate insulating layer 140 is formed on the gate lines 121. A plurality of semiconductors 154, a plurality of ohmic contacts 163 and 165, a plurality of data lines 171 including a plurality of source electrodes 173 and a plurality of data pads 179, and a plurality of drain electrodes 175 are formed on the gate insulating layer 140. The first passivation layer 180x and an organic layer 80 are formed on the data lines 171 and the drain electrodes 175. The organic layer 80 is not formed where the first contact holes 186, the second contact holes 187, and the third contact holes 185 are formed.

According to exemplary embodiments, the organic layer 80 may be the color filter 230, and the light blocking member 220 may be formed on or under the color filter 230. The portion of the organic layer 80 disposed in association with a display area where a plurality of pixels are disposed to display an image may be of a first thickness H1, which is larger than a second thickness H2 of the organic layer 80 disposed in association with a peripheral area, where the gate pads 129 or the data pads 179 are disposed. As previously mentioned, the organic layer 80 may be omitted.

The first contact holes 186 exposing the gate pads 129 are formed in the first passivation layer 180x and the gate insulating layer 140 disposed in the region not covered by the organic layer 80. The second contact holes 187 exposing the data pads 179 and the third contact holes 185 exposing the drain electrodes 175 are formed in the first passivation layer 180x disposed in the region not covered by the organic layer 80.

A plurality of pixel electrodes 191 disposed on the organic layer 80 and connected to the drain electrodes 175 through the third contact holes 185 is formed. The first contact assistants 96 covering the gate pads 129 exposed through the first contact holes 186 are formed on the first passivation layer 180x, and the second contact assistants 97 covering the data pads 179 exposed through the second contact holes 187 are formed on the first passivation layer 180x. As previously noted, the pixel electrodes 191 and the first and second contact assistants 96 and 97 may be formed of any suitable transparent conductor.

As shown in FIGS. 1-4, the second passivation layer 180y and the common electrode 270 are formed on the pixel electrode 191. This will be described in more detail in association with FIGS. 11-28.

Figure 11:
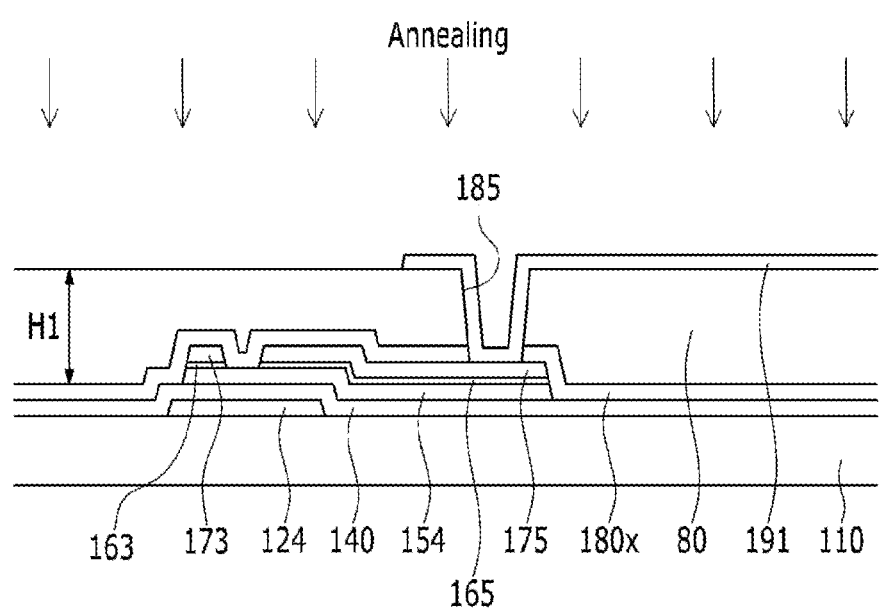
FIGS. 11, 14, 17, 20, 23, and 26 are respective cross-sectional views of the liquid crystal display of FIG. 1 taken along sectional line II-II at various manufacturing stages, according to exemplary embodiments.
Figure 12:
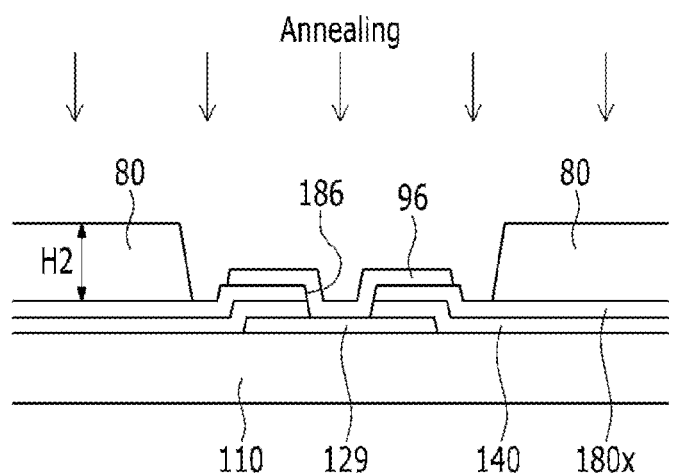
FIGS. 12, 15, 18, 21, 24, and 27 are respective cross-sectional views of the liquid crystal display of FIG. 1 taken along sectional line III-III at various manufacturing stages, according to exemplary embodiments.
Figure 13:
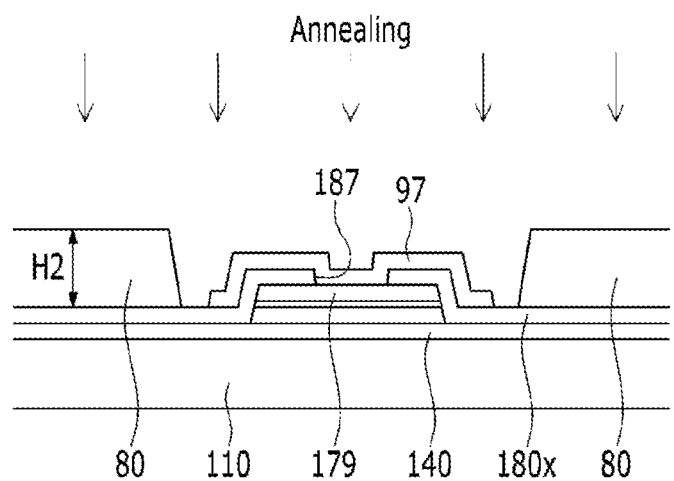
FIGS. 13, 16, 19, 22, 25, and 28 are respective cross-sectional views of the liquid crystal display of FIG. 1 taken along sectional line IV-IV at various manufacturing stages, according to exemplary embodiments.

As shown in FIGS. 11-13, the first substrate 110 including the pixel electrodes 191 and the first and second contact assistants 96 and 97 is annealed to form a polycrystalline transparent conductor including the pixel electrodes 191, the first contact assistant 96, and the second contact assistant 97, such as AZO, GZO, ITO, IZO, etc.

Figure 14:
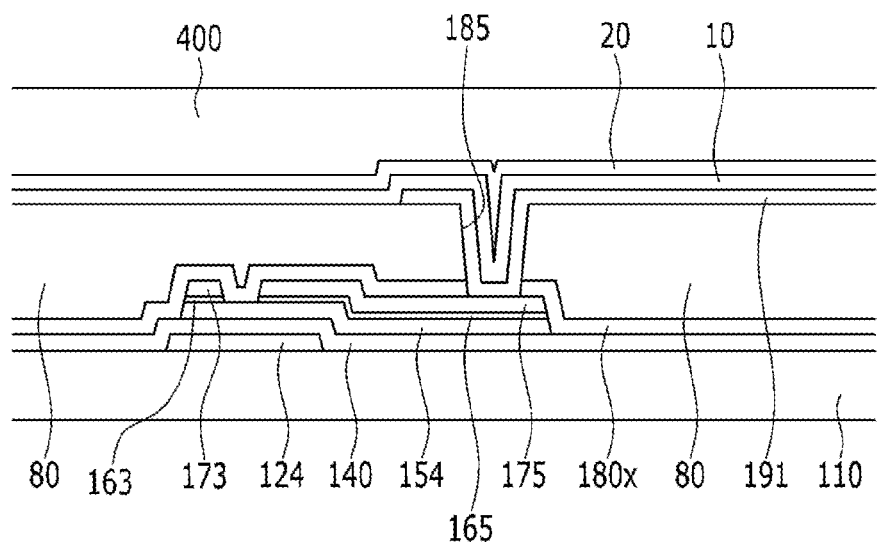
Figure 15:
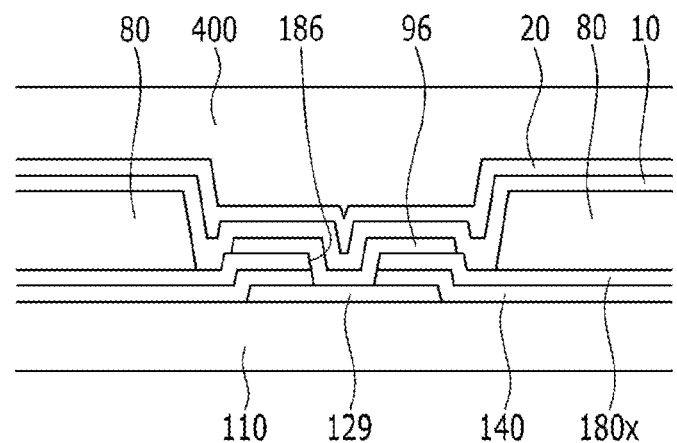
Figure 16:
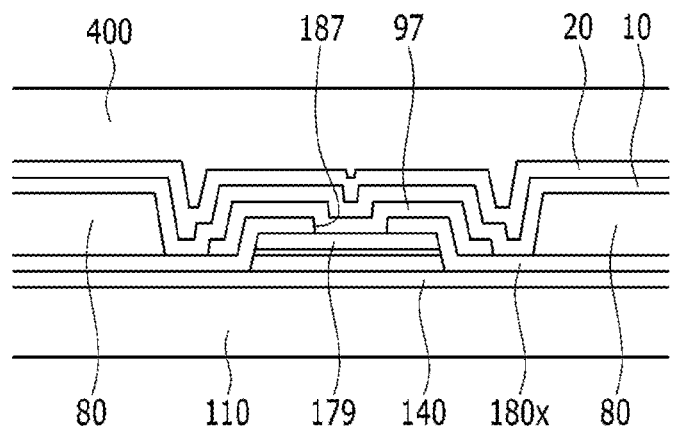

Referring to FIGS. 14-16, a first layer 10 made of (or otherwise including) silicon nitride (SiNx) or silicon oxide (SiOx) is deposited on the first substrate 110 including the pixel electrodes 191 and the first and second contact assistants 96 and 97, each of which may be made of the polycrystalline AZO, GZO, ITO, IZO, etc. A second layer 20 made of the transparent conductor, such as AZO, GZO, ITO, IZO, etc., is deposited on the first layer 10. A first photosensitive film 400 is deposited on the second layer 20.

Figure 17:
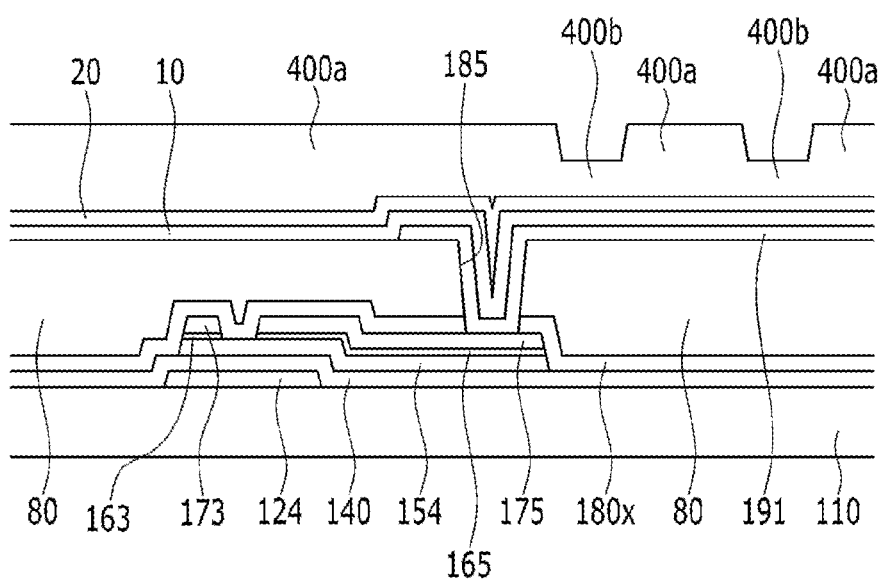
Figure 18:
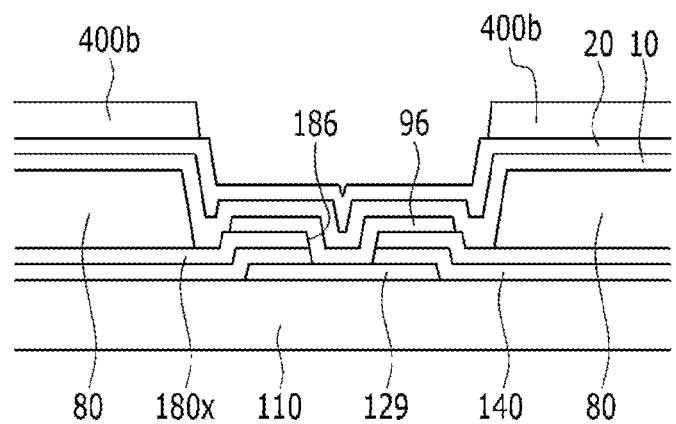
Figure 19:
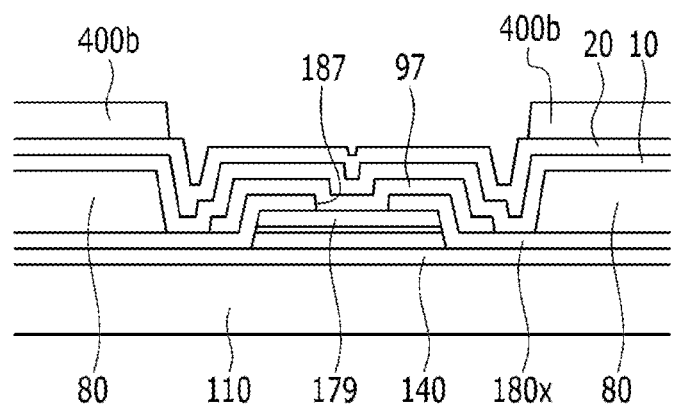

Adverting to FIGS. 17-19, the first photosensitive film 400 is exposed and developed to form a first photosensitive film pattern including various portions (e.g., portions 400a and 400b) of different thicknesses depending on the respective positions of the portions.

Any suitable method to form the different thicknesses of the photosensitive film 400 may be utilized. For example, a photomask may be formed with a translucent area, a light transmitting area, and a light blocking area. The translucent area may be provided with a slit pattern or a lattice pattern, or as a thin film having medium transmittance or thickness. When provided including a slit pattern, the slit width or the space between slits may be smaller than the resolution of the exposure equipment used in the photolithography process. Accordingly, when the photosensitive film 400 is exposed and developing use the photomask, the various portions (e.g., portions 400a and 400b) of different thicknesses may be provided. As another example, a reflowable photosensitive film may be formed. For instance, a thin portion may be formed by making a photosensitive film flow into a region where the photosensitive film is not present after forming the reflowable photosensitive film with a general exposure mask including a light transmitting area and a light blocking area. This may reduce the number of photolithography processes, and, thereby, may also reduce the complexity and cost of the manufacturing method.

According to exemplary embodiments, the photosensitive film pattern 400a of a first (e.g., thicker) thickness may be disposed in a region where the common electrode 270 and the second passivation layer 180y are formed. The photosensitive film pattern 400b of a second (e.g., thinner) thickness may be disposed in a region where the first cutouts 271 and the second cutouts 181 are formed in the common electrode 270 and the second passivation layer 180y. It is noted that the photosensitive film pattern may not be formed in the peripheral area where the gate pads 129 and the data pads 179 are disposed.

Figure 20:
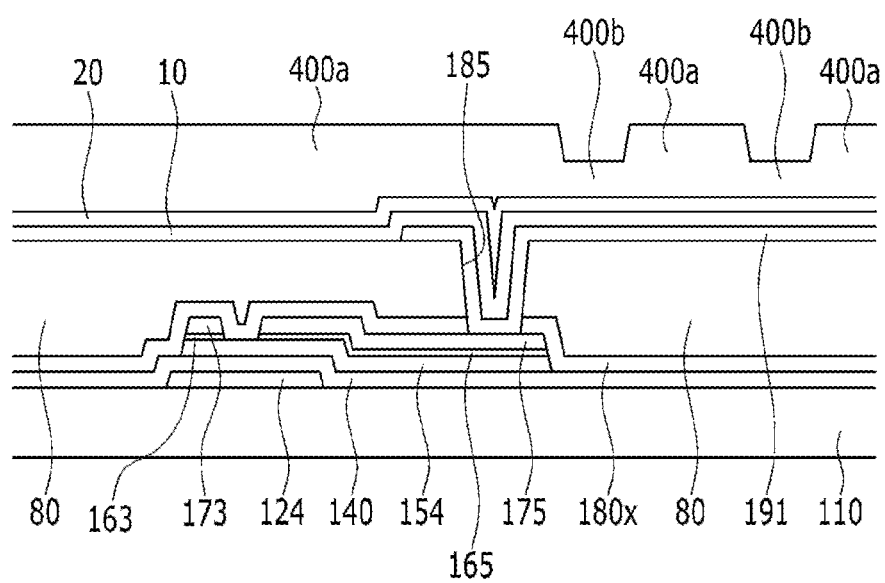
Figure 21:
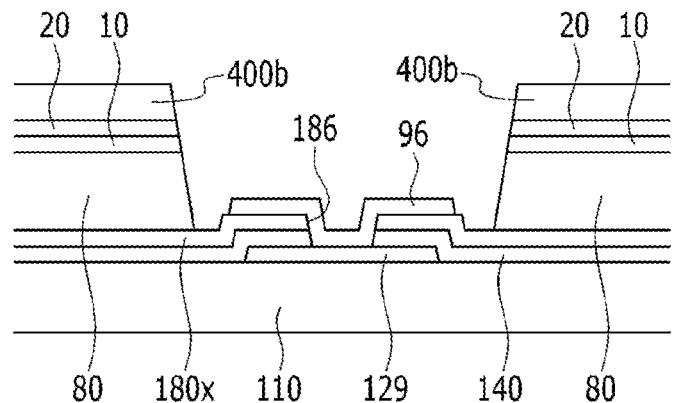
Figure 22:
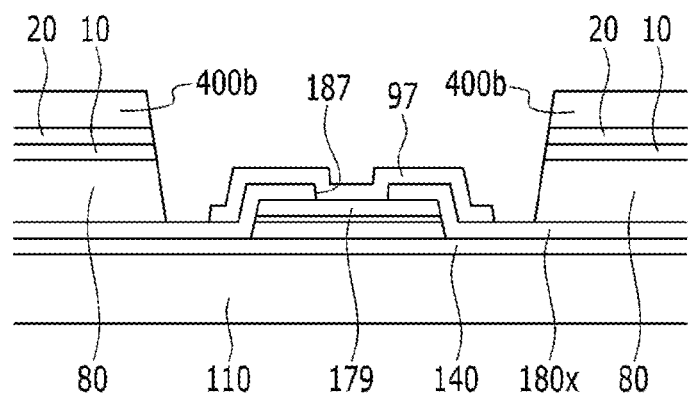

With reference to FIGS. 20-22, the second layer 20 and the first layer 10 may be sequentially etched using the photosensitive film patterns (e.g., patterns 400a and 400b) as an etching mask to remove the first layer 10 and the second layer 20 in the peripheral area where the gate pads 129 and the data pads 179 are disposed. In this manner, the first contact assistants 96 and the second contact assistants 97 disposed on the gate pads 129 and the data pads 179 are exposed.

Figure 23:
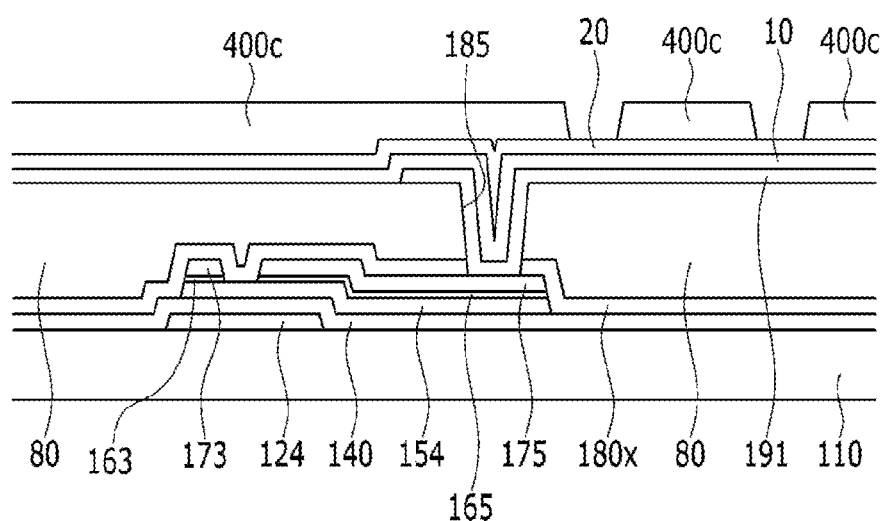
Figure 24:
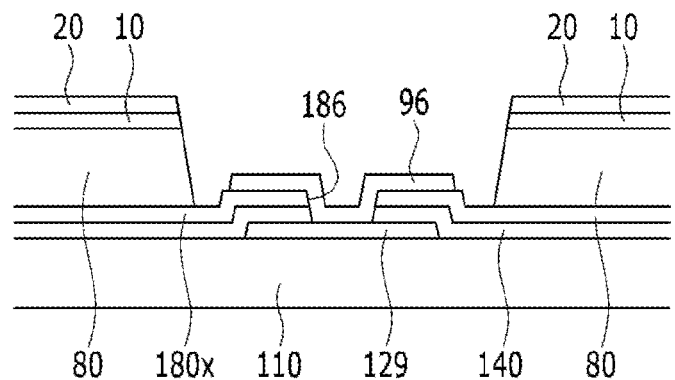
Figure 25:
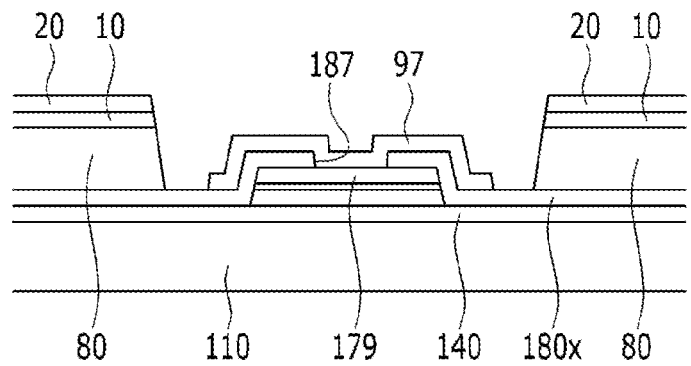

As shown in FIGS. 23-25, the first photosensitive film patterns (e.g., patterns 400a and 400b) may be ashed to decrease the thickness of the photosensitive film pattern 400a of the thicker thickness and simultaneously remove the photosensitive film pattern 400b of the thinner thickness. In this manner, the ashing process may form a second photosensitive film pattern 400c.

Figure 26:
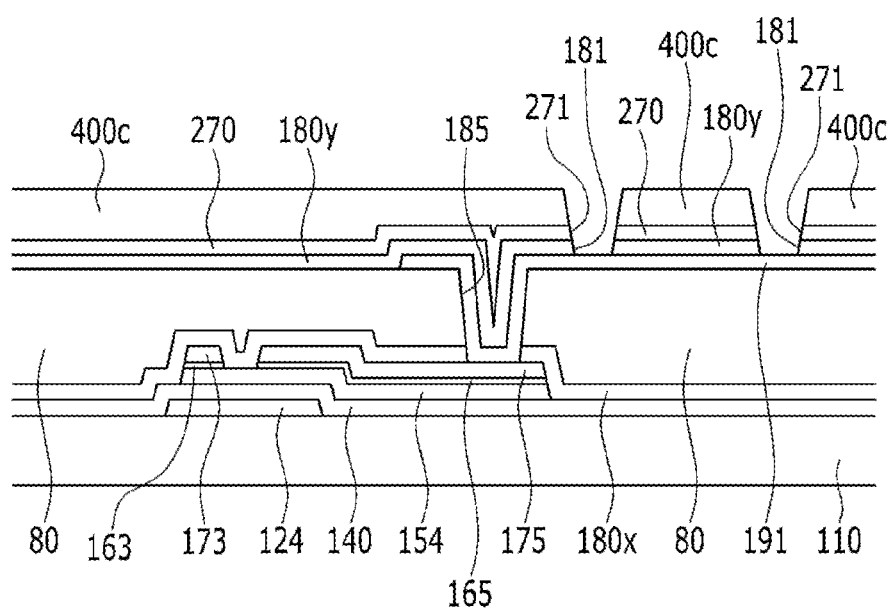
Figure 27:
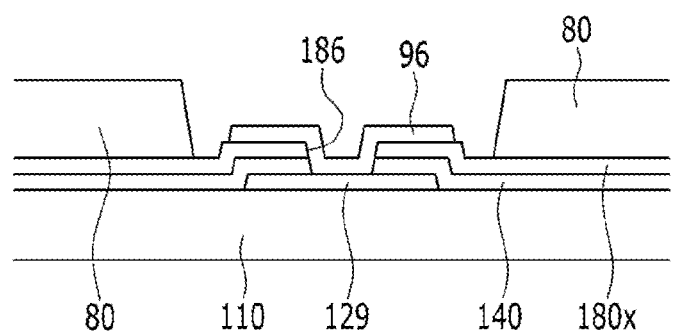
Figure 28:
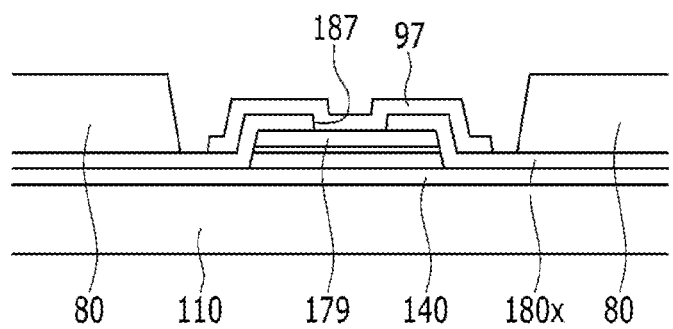

Adverting to FIGS. 26-28, the second layer 20 and the first layer 10 are sequentially etched using the second photosensitive film pattern 400c as an etching mask, which forms the common electrode 270 including the plurality of first cutouts 271 and the second passivation layer 180y including the plurality of second cutouts 181. In this manner, the second layer 20 and the first layer 10 are removed from the peripheral area where the gate pads 129 and the data pads 179 are disposed. The first and second contact assistants 96 and 97 are annealed to form a polycrystalline transparent conductive material. Since the second layer 20 is not a polycrystalline transparent conductive material, the first and second contact assistants 96 and 97 are not etched when the second layer 20 is etched.

The second photosensitive film pattern 400c is removed to form the lower panel 100.

As described above, after forming the lower panel 100, the upper panel 200 is formed. The liquid crystal layer 3 is injected between the lower and upper panels 100 and 200, and, thereby, forming the liquid crystal display shown in FIGS. 1-4.

According to exemplary embodiments, the common electrode 270 and the second passivation layer 180y may be simultaneously formed, which may decrease manufacturing time, cost, and complexity.

Figure 29:
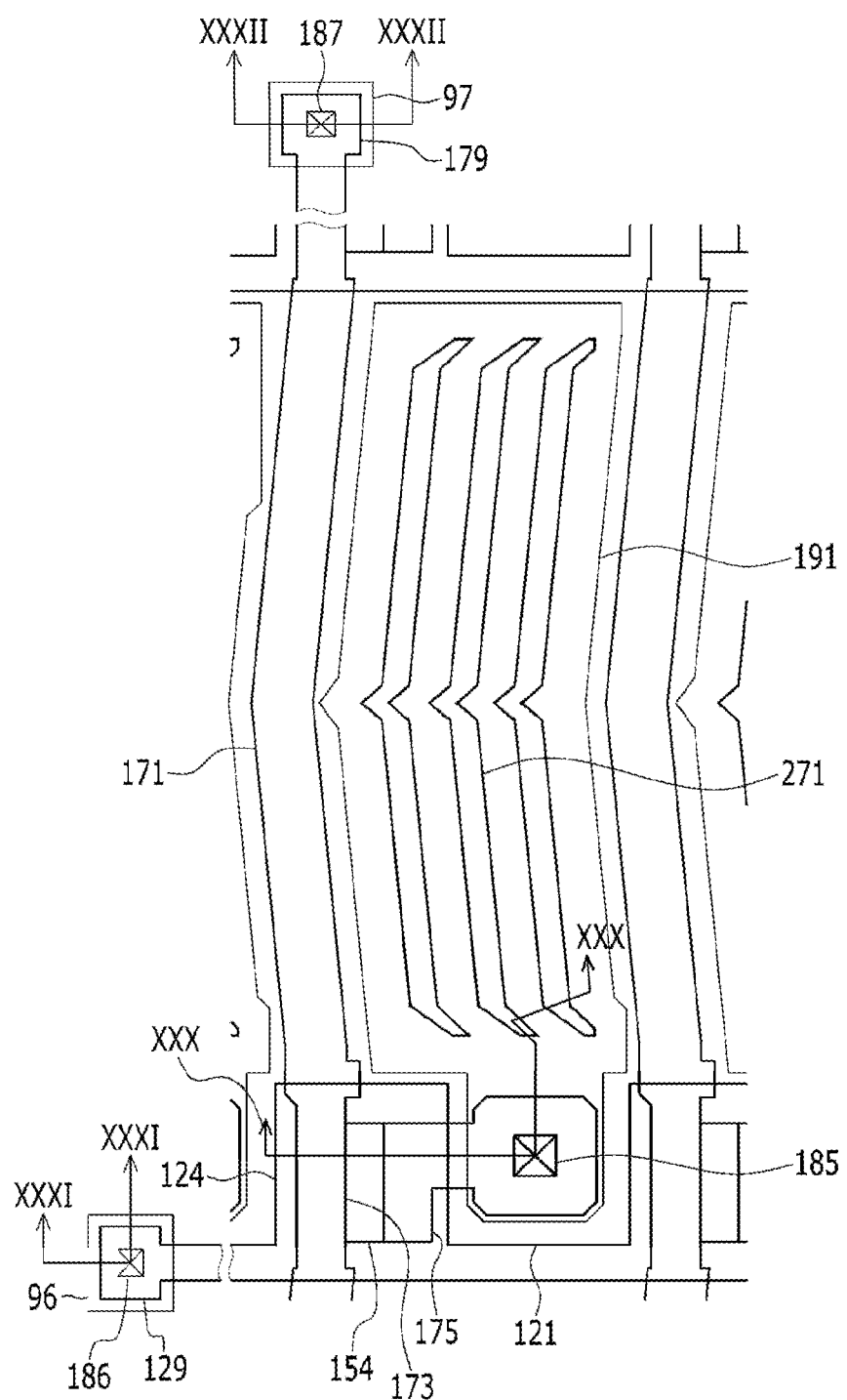
FIG. 29 is a layout view of a liquid crystal display, according to exemplary embodiments.
Figure 30:
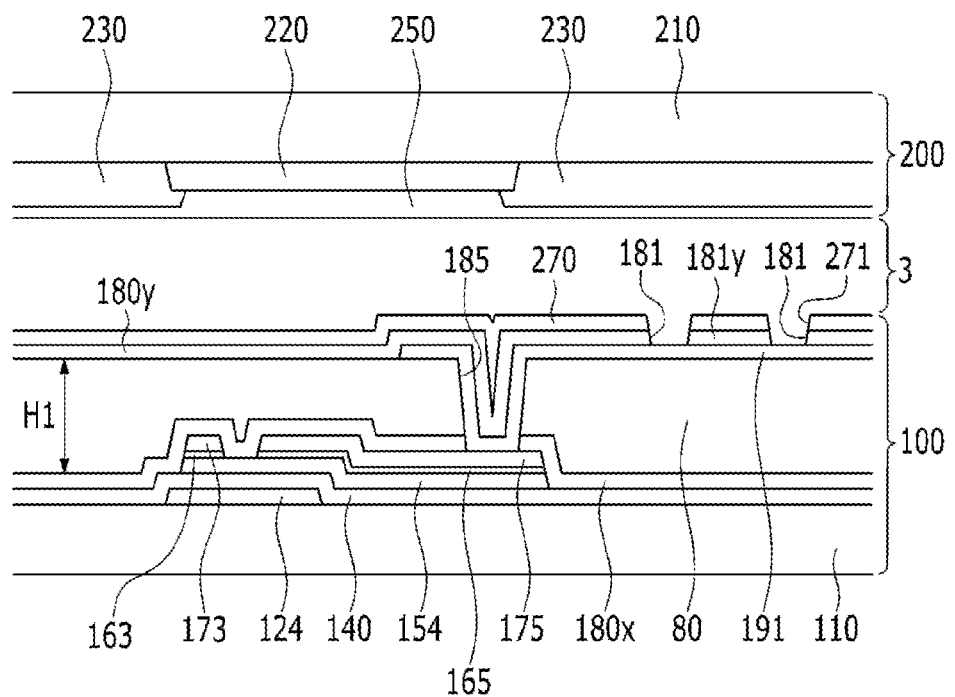
FIG. 30 is a cross-sectional view of the liquid crystal display of FIG. 29 taken along sectional line XXX-XXX, according to exemplary embodiments.
Figure 31:
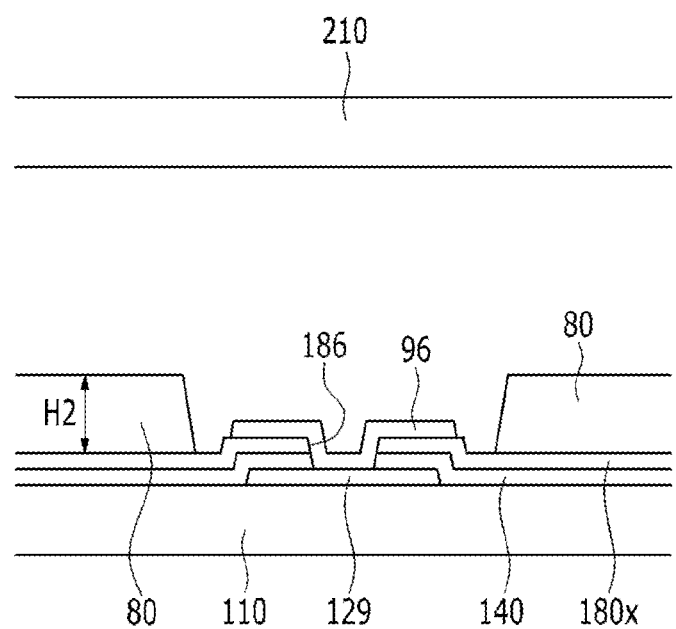
FIG. 31 is a cross-sectional view of the liquid crystal display of FIG. 29 taken along sectional line XXXI-XXXI, according to exemplary embodiments.
Figure 32:
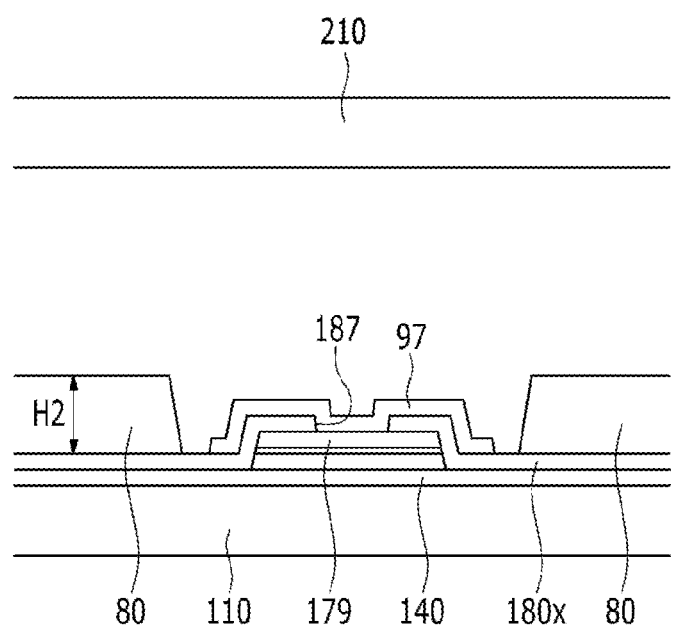
FIG. 32 is a cross-sectional view of the liquid crystal display of FIG. 29 taken along sectional line XXXII-XXXII, according to exemplary embodiments.

FIG. 29 is a layout view of a liquid crystal display, according to exemplary embodiments. FIG. 30 is a cross-sectional view of the liquid crystal display of FIG. 29 taken along sectional line XXX-XXX. FIG. 31 is a cross-sectional view of the liquid crystal display of FIG. 29 taken along sectional line XXXI-XXXI. FIG. 32 is a cross-sectional view of the liquid crystal display of FIG. 29 taken along sectional line XXXII-XXXII. The liquid crystal display of FIGS. 29-32 is substantially similar to the liquid crystal display of FIGS. 1-4, and, as such, differences between these liquid crystal displays are described below. In other words, to avoid obscuring exemplary embodiments described herein, duplicative descriptions of similarly configured features are omitted.

Referring to FIGS. 29-32, a liquid crystal display, according to exemplary embodiments, includes a lower panel 100, an upper panel 200 facing the lower panel 100, and a liquid crystal layer 3 disposed therebetween.

The lower panel 100 will now be described in more detail.

Gate conductors including the gate lines 121, the gate electrodes 124, and the gate pads 129 are formed on the first insulating substrate 110, which may be formed of any suitable material, such as, for instance, transparent glass, plastics, or the like.

The gate insulating layer 140, which may be formed of any suitable material, e.g., silicon nitride (SiNx), silicon oxide (SiOx), or the like, may be formed on the gate conductors 121, 124, and 129.

The semiconductors 154 made of any suitable material, e.g., amorphous silicon, polysilicon, or the like, may be formed on the gate insulating layer 140. The semiconductors 154 may include an oxide semiconductor.

The ohmic contacts 163 and 165 may be formed on the semiconductors 154. When the semiconductors 154 include the oxide semiconductor, the ohmic contacts 163 and 165 may be omitted.

The data conductors, including the data lines 171 including the source electrodes 173 and the data pads 179, and the drain electrodes 175, are formed on the ohmic contacts 163 and 165 and the gate insulating layer 140.

The first passivation layer 180x is disposed on the data conductors 171, 173, 175, and 179, the gate insulating layer 140, and the exposed portions of the semiconductors 154. The first passivation layer 180x may include any suitable material, such as an organic insulating material, an inorganic insulating material, and/or the like.

An organic layer 80 is disposed on the first passivation layer 180x. The organic layer 80 may be thicker than the first passivation layer 180x and may have a flat surface, such as a flat upper surface.

The first thickness H1 of a portion of the organic layer 80 disposed in a display area where a plurality of pixels are disposed to display an image may be larger than the second thickness H2 of a portion of the organic layer 80 disposed in a peripheral area where the gate pads 129 or the data pads 179 are disposed. It is contemplated that the organic layer 80 may be omitted.

According to exemplary embodiments, the organic layer 80, the first passivation layer 180x, and the gate insulating layer 140 include the first contact holes 186 exposing the gate pads 129. The organic layer 80 and the first passivation layer 180x also include the second contact holes 187 exposing the data pads 179, as well as include the third contact holes 185 exposing the drain electrodes 175.

The pixel electrodes 191 may be disposed on the organic layer 80.

The first contact assistants 96 covering the gate pads 129 exposed through the first contact holes 186 may be disposed on the first passivation layer 180x, and the second contact assistants 97 covering the data pads 179 exposed through the second contact holes 187 may be disposed on the first passivation layer 180x.

The first contact assistants 96 and the second contact assistants 97 are connected to the gate pads 129 and the data pads 179 through the first and second contact holes 186 and 187, respectively.

In exemplary embodiments, the pixel electrodes 191 are physically and electrically connected to the drain electrodes 175 through the third contact holes 185 formed in the organic layer 80 and the first passivation layer 180x. As such, the pixel electrodes are configured to receive data voltages from the drain electrodes 175.

The second passivation layer 180y may be formed on the pixel electrodes 191. A common electrode 270 may be formed on the second passivation layer 180y. The common electrode 270 may be made of any suitable transparent conductive material, such as, for example, AZO, GZO, ITO, IZO, etc. It is also contemplated that one or more conductive polymers (ICP) may be utilized, such as, for example, polyaniline, poly(3,4-ethylenedioxythiophene) poly(styrenesulfonate) (PEDOT:PSS), etc.

In exemplary embodiments, the second passivation layer 180y and the common electrode 270 may be disposed in the display area including a plurality of pixels, but may not be disposed in the peripheral area where the gate pads 129 and the data pads 179 are formed. The common electrode 270 includes a plurality of the first cutouts 271.

According to exemplary embodiments, the edge of the second passivation layer 180y may be protruded from the edge of the common electrode 270. For instance, the edge of the second passivation layer 180y may be protruded from the edge of the common electrode 270 by about 2 μm to about 3 μm. In exemplary embodiments, the edge of the second passivation layer 180y may be protruded from the edge of the common electrode 270 by more than half the width of the first cutout 271.

Although not shown, an alignment layer may be coated on the common electrode 270 and the pixel electrodes 191 exposed by the second cutouts 181 of the second passivation layer 180y and the first cutouts 271 of the common electrode 270. The alignment layer may be a horizontal alignment layer that is rubbed in a determined direction. It is also contemplated that the alignment layer may additionally (or alternatively) include an optical reaction material that is optically aligned to prealign liquid crystal molecules of the liquid crystal layer 3.

The upper display panel 200 will now be described in more detail.

The light blocking member 220 and a plurality of color filters 230 may be formed on the second insulating substrate 210 made of (or otherwise including) any suitable material, e.g., transparent glass, plastic, etc.

An overcoat 250 may be formed on the color filters 230 and the light blocking member 220. Further, an alignment layer (not shown) may be disposed on the overcoat 250 and may be similar to the alignment layer (not illustrated) that may be disposed on the common electrode 270 and the pixel electrodes 191 exposed by the second cutouts 181 of the second passivation layer 180y and the first cutouts 271 of the common electrode 270.

According to exemplary embodiments, the liquid crystal layer 3 includes a nematic liquid crystal material having positive dielectric anisotropy. The liquid crystal molecules of the liquid crystal layer 3 may be arranged so that a long axis direction thereof is parallel to the upper and lower panels 100 and 200.

During operation, the pixel electrodes 191 receive data voltages from the drain electrodes 175, and the common electrode 270 receives a common voltage having a determined magnitude from a common voltage application portion (described in more detail in association with FIG. 33), which may be disposed outside of the display region, e.g., in the peripheral area. In this manner, the liquid crystal molecules of the liquid crystal layer 3 disposed on the two field generating electrodes 191 and 270 may be rotated in a direction parallel to a direction of an imposed electric field when the electric field is generated in association with the pixel electrode 191 and the common electrode 270. As previously described, based on the rotational direction of the liquid crystal molecules, the polarization of incident light passing through the liquid crystal layer 3 may be changed to facilitate the display of images.

According to exemplary embodiments, the second passivation layer 180y and the common electrode 270 may be formed together by using one photomask (or reticle), which may reduce manufacturing costs, time, and complexity.

As seen in FIGS. 29-32, the organic layer 80 may be disposed on the first passivation layer 180x of the lower panel 100, and the upper panel 200 may include the color filter 230 and the light blocking member 220. It is contemplated, however, that the color filters 230 may be disposed on the lower panel 100 instead of (or in place of) the organic layer 80, and, as such, the upper panel 200 may not include the color filters 230. In this manner, the light blocking member 220 may also be disposed on the lower panel 100 rather than the upper panel 200. Such a configuration was previously described in more detail in association with FIGS. 5A-5C.

Figure 33:
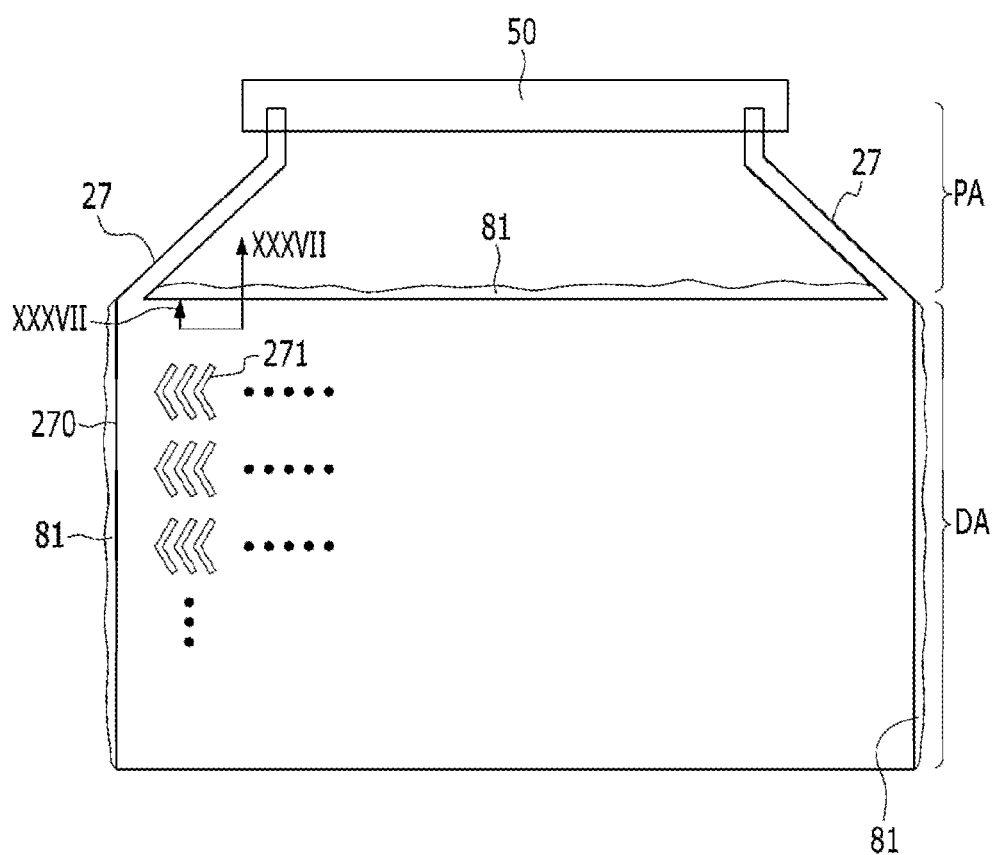
FIG. 33 is a layout view of a portion of a liquid crystal display, according to exemplary embodiments.
Figure 34:
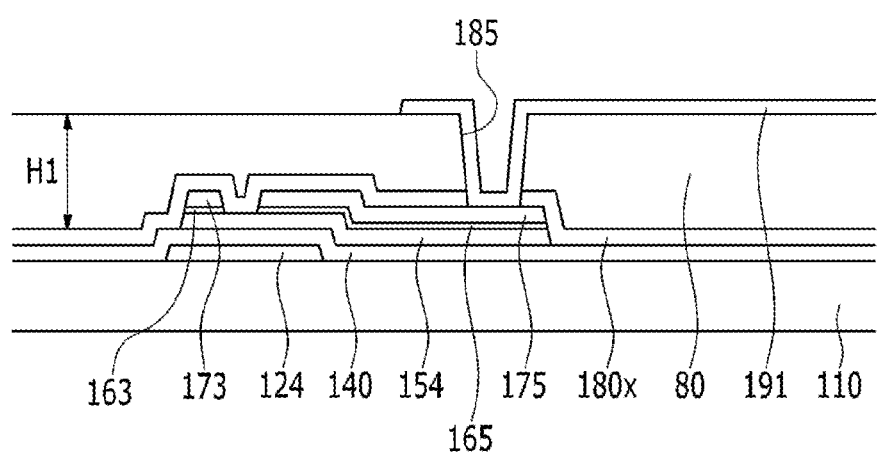
FIGS. 34, 38, 42, 46, 50, and 54 are respective cross-sectional views of the liquid crystal display of FIG. 29 taken along sectional line XXX-XXX at various manufacturing stages, according to exemplary embodiments.
Figure 35:
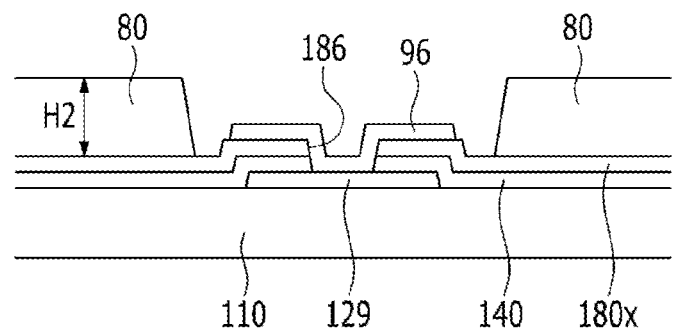
FIGS. 35, 39, 43, 47, 51, and 55 are respective cross-sectional views of the liquid crystal display of FIG. 29 taken along sectional line XXXI-XXXI at various manufacturing stages, according to exemplary embodiments.
Figure 36:
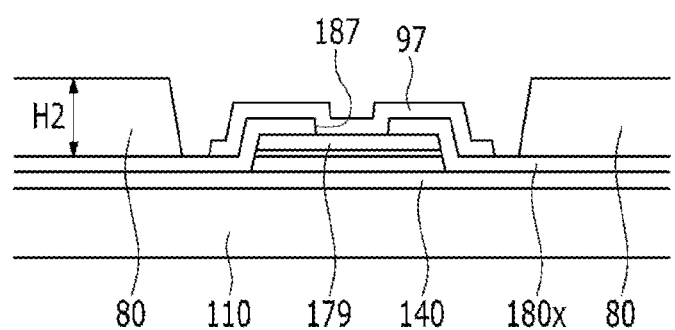
FIGS. 36, 40, 44, 48, 52, and 56 are respective cross-sectional views of the liquid crystal display of FIG. 29 taken along sectional line XXXII-XXXII at various manufacturing stages, according to exemplary embodiments.
Figure 37:
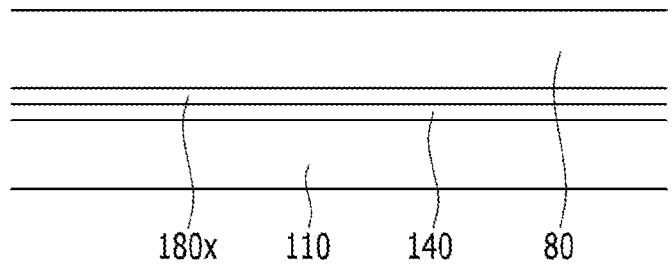
FIGS. 37, 41, 45, 49, 53, and 57 are respective cross-sectional views of the liquid crystal display of FIG. 33 taken along sectional line XXXVII-XXXVII at various manufacturing stages, according to exemplary embodiments.
Figure 38:
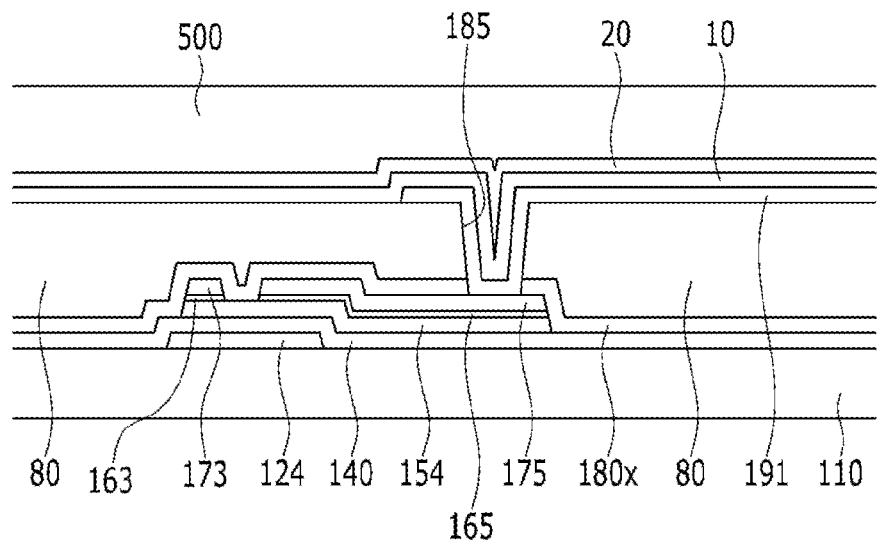
Figure 39:
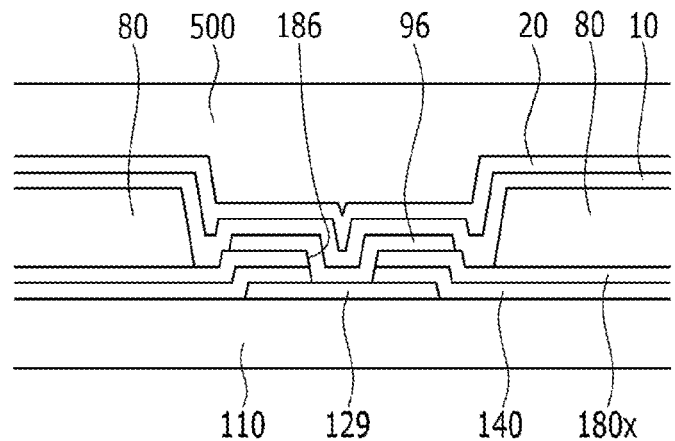
Figure 40:
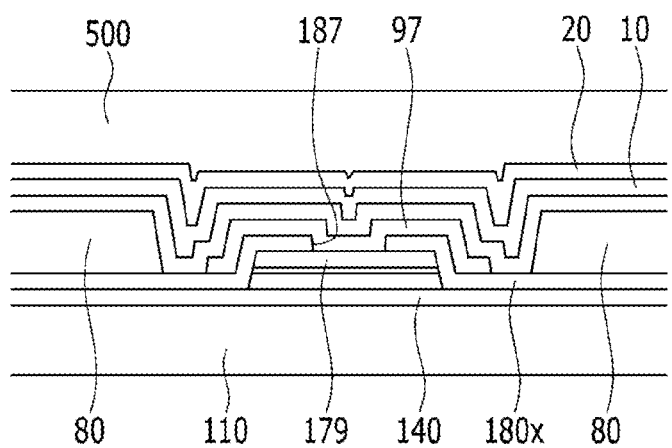
Figure 41:
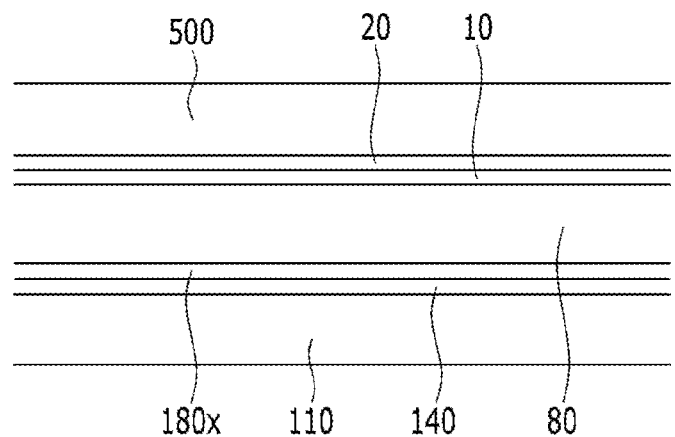
Figure 42:
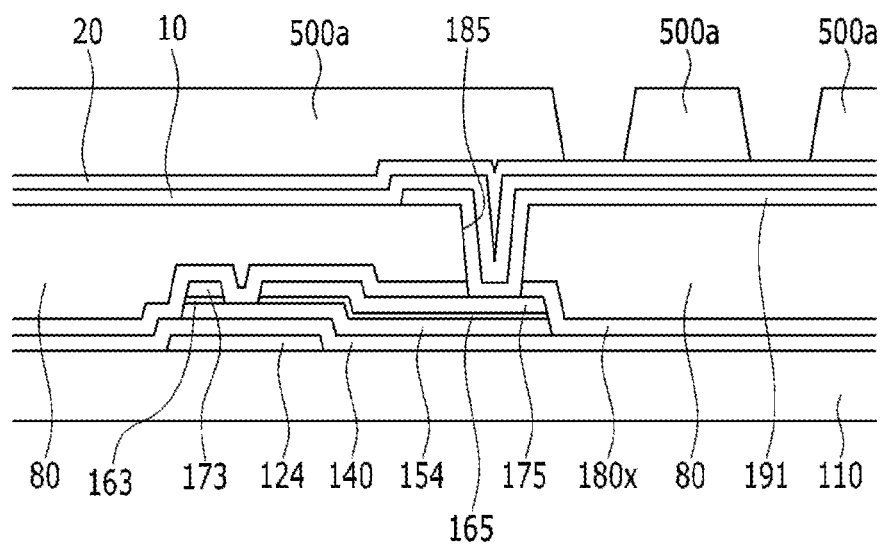
Figure 43:
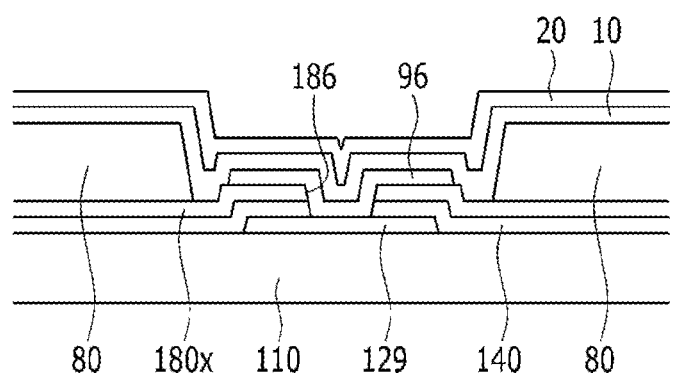
Figure 44:
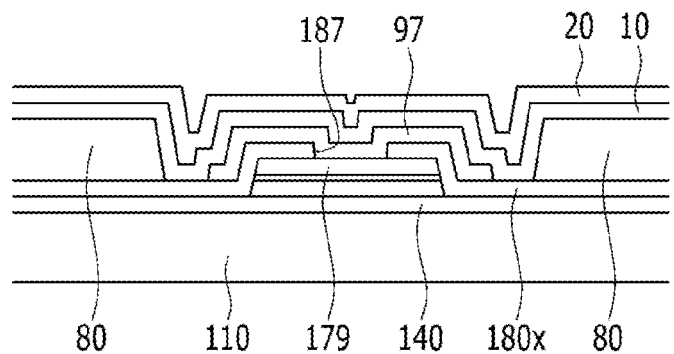
Figure 45:
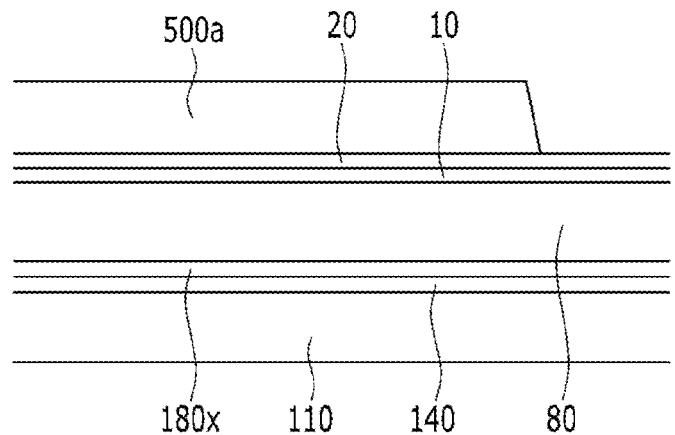
Figure 46:
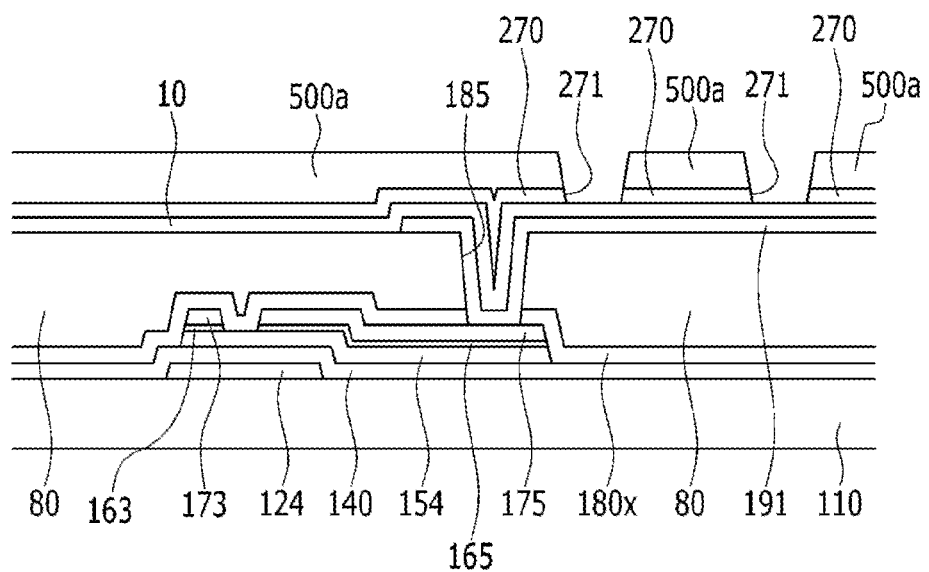
Figure 47:
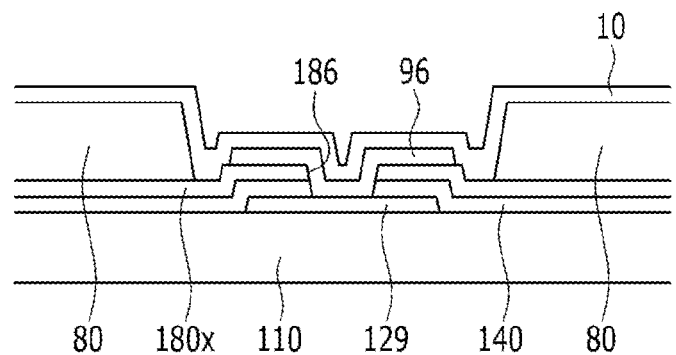
Figure 48:
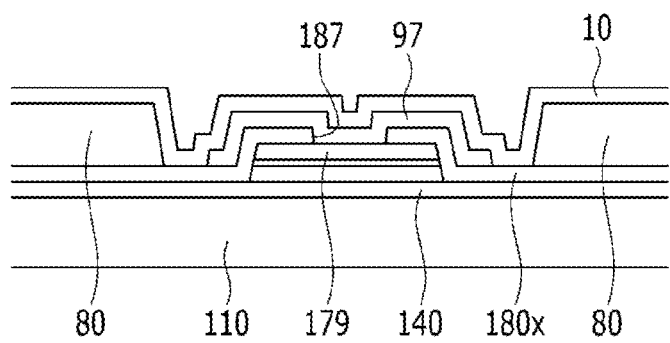
Figure 49:
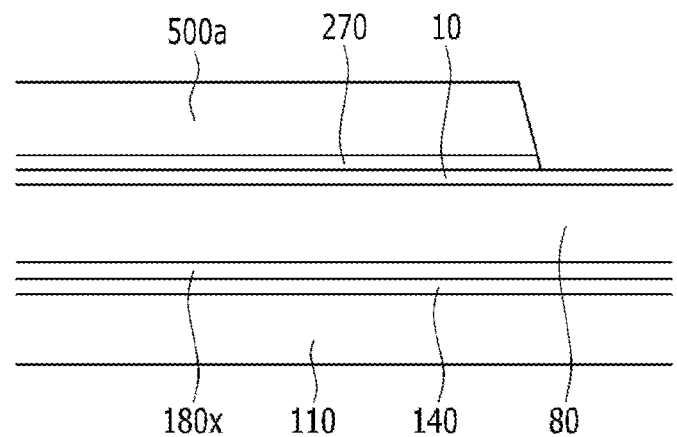
Figure 50:
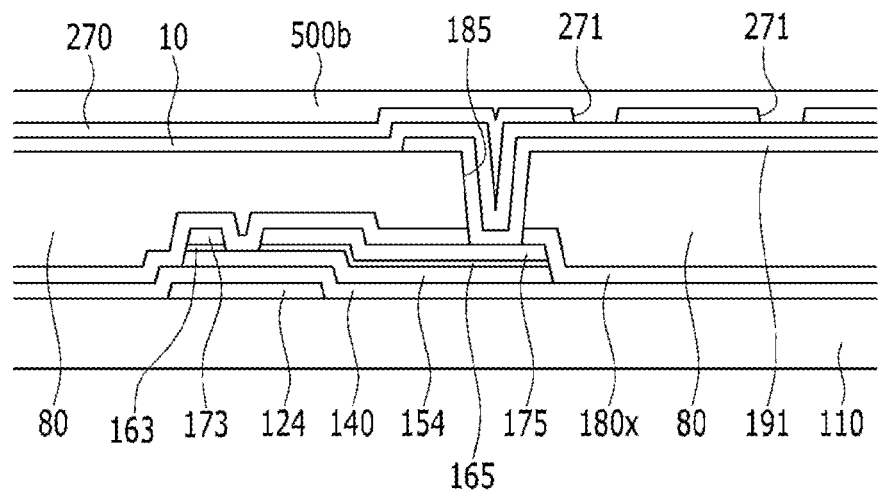
Figure 51:
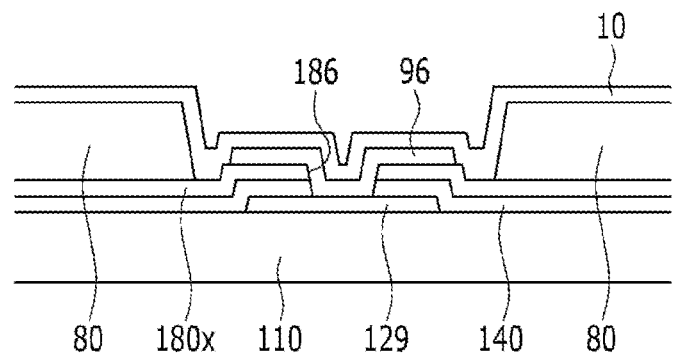
Figure 52:
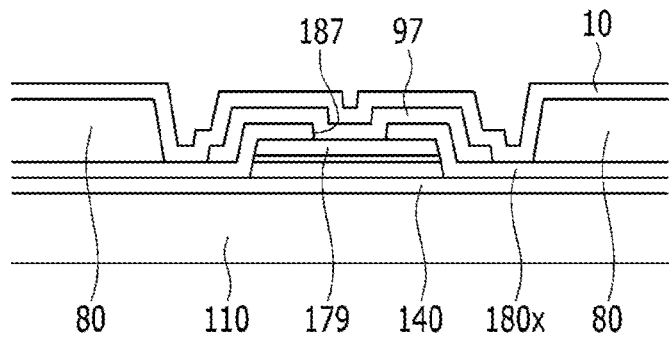
Figure 53:
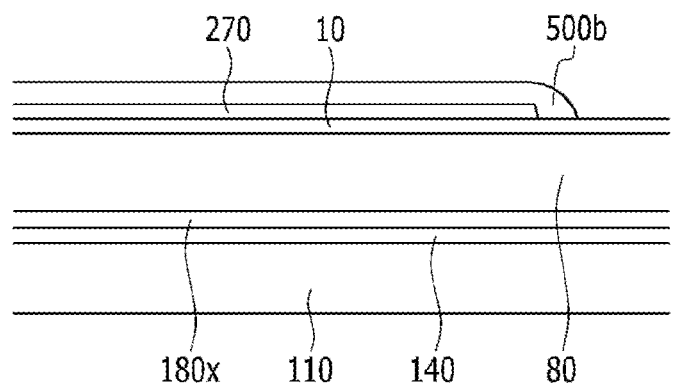
Figure 54:
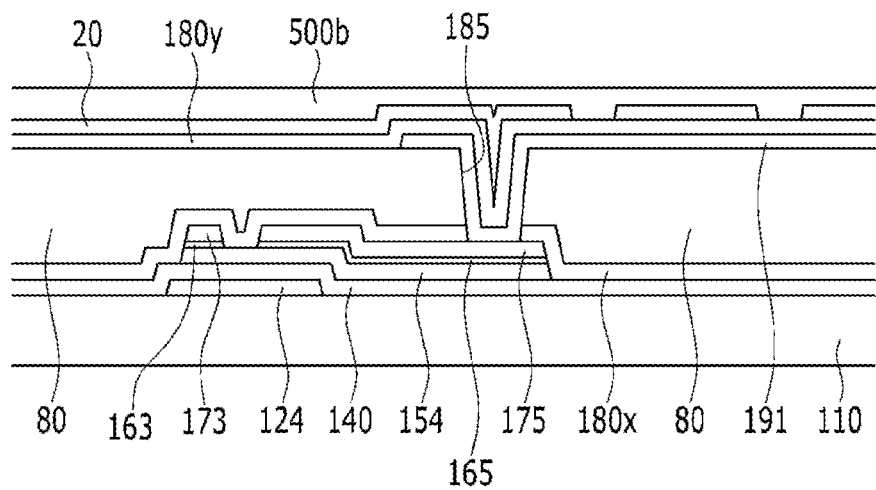
Figure 55:
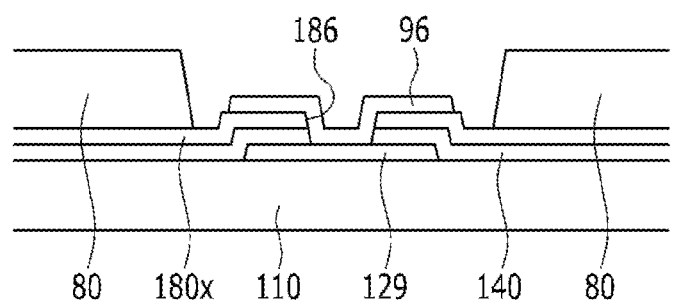
Figure 56:
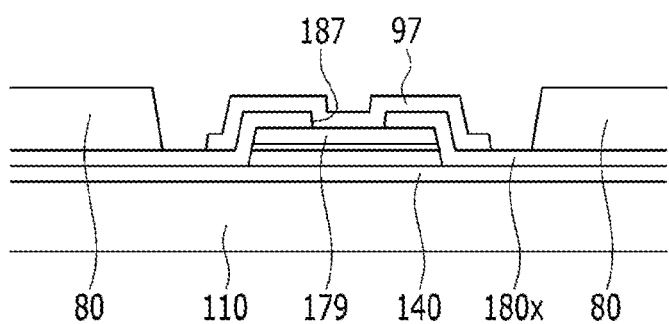
Figure 57:
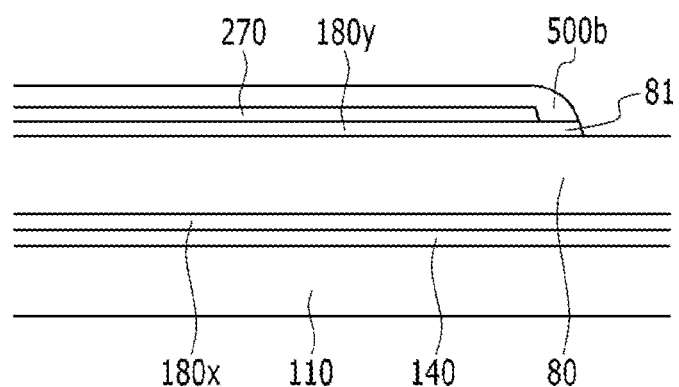

An exemplary plane shape of the common electrode 270 will now be described in more detail with reference to FIG. 33. FIG. 33 is a layout view of a portion of a liquid crystal display, according to exemplary embodiments.

Referring to FIG. 33, the liquid crystal display includes a display area DA including a plurality of pixels and a peripheral area PA near the display area DA.

The common electrode 270 including a plurality of first cutouts 271 disposed in association with each pixel area is disposed in the display area DA. The first cutouts 271, which are disposed in association with each pixel area, are also formed in correspondence with each pixel electrode 191 disposed in each respective pixel area.

A common voltage application unit 50 applying the common voltage to the common electrode 270 is disposed in the peripheral area PA. A connection 27 is disposed between the common voltage application unit 50 and the common electrode 270. The common electrode 270 and the connection 27 may be simultaneously formed in the same layer.

According to exemplary embodiments, the second passivation layer 180y disposed under the common electrode 270 may include a protrusion 81 protruded from the edge of the common electrode 270. The protrusion 81 of the second passivation layer 180y may be protruded from the edge of the common electrode 270 by about 2 μm to about 3 μm. For instance, the width of the protrusion 81 of the second passivation layer 180y may be more than half the width of the first cutout 271.

An exemplary manufacturing method to fabricate an exemplary liquid crystal display will now be described in more detail with reference to FIGS. 34-57, as well as in conjunction with FIGS. 29-32.

FIGS. 34, 38, 42, 46, 50, and 54 are respective cross-sectional views of the liquid crystal display of FIG. 29 taken along sectional line XXX-XXX at various manufacturing stages, according to exemplary embodiments. FIGS. 35, 39, 43, 47, 51, and 55 are respective cross-sectional views of the liquid crystal display of FIG. 29 taken along sectional line XXXI-XXXI at various manufacturing stages, according to exemplary embodiments. FIGS. 36, 40, 44, 48, 52, and 56 are respective cross-sectional views of the liquid crystal display of FIG. 29 taken along sectional line XXXII-XXXII at various manufacturing stages, according to exemplary embodiments. FIGS. 37, 41, 45, 49, 53, and 57 are respective cross-sectional views of the liquid crystal display of FIG. 29 taken along sectional line XXXVII-XXXVII at various manufacturing stages, according to exemplary embodiments.

As shown in FIGS. 34-37, a plurality of gate lines 121 including a plurality of gate electrodes 124 and a plurality of gate pads 129 are formed on the first insulation substrate 110. A gate insulating layer 140 is formed on the gate lines 121. A plurality of semiconductors 154, a plurality of ohmic contacts 163 and 165, a plurality of data lines 171 including a plurality of source electrodes 173 and a plurality of data pads 179, and a plurality of drain electrodes 175, are formed on the gate insulating layer 140. The first passivation layer 180x and an organic layer 80 are formed on the data lines 171 and the drain electrodes 175. The organic layer 80 is not formed where the first contact holes 186, the second contact holes 187, and the third contact holes 185 are formed.

According to exemplary embodiments, the organic layer 80 may be the color filter 230, and the light blocking member 220 may be formed on or under the color filter 230. The portion of the organic layer 80 disposed in association with a display area where a plurality of pixels are disposed to display an image may be of a first thickness H1, which is larger than a second thickness H2 of the organic layer 80 disposed in association with a peripheral area, where the gate pads 129 or the data pads 179 are disposed. As previously mentioned, the organic layer 80 may be omitted.

The first contact holes 186 exposing the gate pads 129 are formed in the first passivation layer 180x and gate insulating layer 140 disposed in the region not covered by the organic layer 80. The second contact holes 187 exposing the data pads 179 and the third contact holes 185 exposing the drain electrodes 175 are formed in the first passivation layer 180x disposed in the region not covered by the organic layer 80.

A plurality of pixel electrodes 191 disposed on the organic layer 80 and connected to the drain electrodes 175 through the third contact holes 185 are formed. The first contact assistants 96 covering the gate pads 129 exposed through the first contact holes 186 are formed on the first passivation layer 180x, and the second contact assistants 97 covering the data pads 179 exposed through the second contact holes 187 are formed on the first passivation layer 180x. As previously mentioned, the pixel electrodes 191 and the first and second contact assistants 96 and 97 may be formed any suitable transparent conductor.

As shown in FIGS. 29-33, the second passivation layer 180y and the common electrode 270 are formed on the pixel electrode 191. This will be described in more detail in association with FIGS. 38-57.

As shown in FIGS. 38-41, the first layer 10 made of (or otherwise including) silicon nitride (SiNx) or silicon oxide (SiOx) is deposited on the first substrate 110 including the pixel electrodes 191, the first and second contact assistants 96 and 97, and the second layer 20, each of which may be made of any suitable transparent conductor, such as AZO, GZO, ITO, IZO, etc., is deposited on the first layer 10. A second photosensitive film 500 is deposited on the second layer 20.

Adverting to FIGS. 42-45, the second photosensitive film 500 is exposed and developed to form a third photosensitive film pattern 500a. The third photosensitive film pattern 500a is disposed in a region where the common electrode 270 will be formed, as will become more apparent below.

With reference to FIGS. 46-49, the second layer 20 is etched using the third photosensitive film pattern 500a as an etching mask to form the common electrode 270 having a plurality of first cutouts 271.

As shown in FIGS. 50-53, the third photosensitive film pattern 500a is reflowed to form a fourth photosensitive film pattern 500b. The fourth photosensitive film pattern 500b covers the first cutouts 271 of the common electrode 270 and the outer edge of the common electrode 270, seen in FIG. 53.

Adverting to FIGS. 54-57, the first layer 10 is etched using the fourth photosensitive film pattern 500b as an etching mask to form the second passivation layer 180y including the protrusion 81 protruded from the outer edge of the common electrode 270. The first and second contact assistants 96 and 97 formed on the gate pads 129 and the data pads 179 are exposed.

The fourth photosensitive film pattern 500b is removed to form the lower panel 100.

As described above, after forming the lower panel 100, the upper panel 200 is formed. The liquid crystal layer 3 is injected between the lower and upper panels 100 and 200 to form the liquid crystal display shown in FIG. 29-FIG. 33.

According to exemplary embodiments, the common electrode 270 and the second passivation layer 180y may be simultaneously formed, which may decrease manufacturing time, cost, and complexity.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:
1. A liquid crystal display, comprising:
   a substrate;
   a gate line comprising a gate pad, the gate line being disposed on the substrate;
   a data line comprising a data pad, the data line being disposed on the substrate;
   a thin film transistor connected to the gate line and the data line;
   an organic layer disposed on the thin film transistor;
   a pixel electrode disposed on the organic layer;
   a first contact assistant disposed on the gate pad;
   a second contact assistant disposed on the data pad;
   a first insulating layer disposed on the pixel electrode, the pixel electrode being disposed between the organic layer and the first insulating layer; and a common electrode disposed on the first insulating layer, the common electrode overlapping with the pixel electrode, wherein:
the common electrode comprises first cutouts,
the first insulating layer comprises second cutouts,
the plane shapes of the first cutouts and the second cutouts are substantially the same, and
the pixel electrode comprises a polycrystalline transparent conductive material.

2. The liquid crystal display of claim 1, wherein:
the organic layer is a color filter.

3. The liquid crystal display of claim 2, further comprising:
a light blocking member disposed on the substrate.

4. A method of manufacturing a display, comprising:
forming a gate line comprising a gate pad and a data line comprising a data pad on a substrate;
forming an organic layer on the gate line and the data line;
forming a pixel electrode on the organic layer, a first contact assistant on the gate pad, and a second contact assistant on the data pad;
annealing the pixel electrode, the first contact assistant, and the second contact assistant to form a polycrystalline material;
depositing a first layer comprising an insulating material on the pixel electrode, the first contact assistant, and the second contact assistant, the pixel electrode being disposed between the organic layer and the first insulating layer;
depositing a second layer comprising a transparent conductive material on the first layer;
forming a first photosensitive film pattern comprising different thicknesses in different regions thereof;
etching the second layer and the first layer using the first photosensitive film pattern as an etching mask to expose at least a portion of the first contact assistant and the second contact assistant;
partially removing the first photosensitive film pattern to form a second photosensitive film pattern; and
etching the second layer and the first layer using the second photosensitive film pattern as an etching mask to form a common electrode comprising first cutouts and a first insulating layer comprising second cutouts.

5. The method of claim 4, wherein forming the organic layer comprises:
forming a color filter on the substrate.

6. The method of claim 5, further comprising:
forming a light blocking member on the first substrate.

* * * * *